(12) United States Patent
Yamauchi

(10) Patent No.: US 12,298,220 B2
(45) Date of Patent: May 13, 2025

(54) INFORMATION PROCESSING APPARATUS, PARTICLE ANALYSIS APPARATUS, INFORMATION PROCESSING METHOD, AND PROGRAM

(71) Applicant: Sony Group Corporation, Tokyo (JP)

(72) Inventor: Yasuharu Yamauchi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 289 days.

(21) Appl. No.: 17/794,819

(22) PCT Filed: Jan. 8, 2021

(86) PCT No.: PCT/JP2021/000438
§ 371 (c)(1),
(2) Date: Jul. 22, 2022

(87) PCT Pub. No.: WO2021/153192
PCT Pub. Date: Aug. 5, 2021

(65) Prior Publication Data
US 2023/0089176 A1 Mar. 23, 2023

(30) Foreign Application Priority Data
Jan. 31, 2020 (JP) .................................. 2020-015226

(51) Int. Cl.
*G01N 15/1434* (2024.01)
*G01N 15/10* (2024.01)

(52) U.S. Cl.
CPC . *G01N 15/1434* (2013.01); *G01N 2015/1006* (2013.01)

(58) Field of Classification Search
CPC ........... G01N 15/1434; G01N 15/1459; G01N 15/1429; G01N 21/64
See application file for complete search history.

(56) References Cited

U.S. PATENT DOCUMENTS 6,738,502 B1  5/2004  Coleman et al.
2011/0282870 A1  11/2011  Herzenberg et al.
(Continued)

FOREIGN PATENT DOCUMENTS

JP  2011-232259 A  11/2011
JP  2012-103159 A  5/2012
(Continued)

OTHER PUBLICATIONS

International Search Report and English translation thereof mailed Mar. 23, 2021 in connection with International Application No. PCT/JP2021/000438.

*Primary Examiner* — Dani Fox
*Assistant Examiner* — Casey Bryant
(74) *Attorney, Agent, or Firm* — Wolf, Greenfield & Sacks, P.C.

(57) ABSTRACT

To provide a technique for easily grasping an influence of correction processing on a two-dimensional plot.
The present technology provides an information processing apparatus including a two-dimensional plot generation unit that generates a two-dimensional plot on the basis of fluorescence data obtained from a particle population labeled with a plurality of fluorescent bodies, and generates a two-dimensional plot group regarding any one fluorescent body of the plurality of fluorescent bodies and each of all the other fluorescent bodies on the basis of correction processing on the two-dimensional plot. Furthermore, the present technology also provides an information processing method including a two-dimensional plot group generation process of generating the two-dimensional plot group, and a program for causing an information processing apparatus to execute a two-dimensional plot group generation process of generating the two-dimensional plot group.

17 Claims, 11 Drawing Sheets

(56) References Cited

U.S. PATENT DOCUMENTS

| | | | |
|---|---|---|---|
| 2012/0016616 A1* | 1/2012 | Kato | G01N 21/6428 |
| | | | 702/189 |
| 2012/0123722 A1 | 5/2012 | Kakuta et al. | |
| 2014/0365159 A1 | 12/2014 | Kato et al. | |
| 2018/0348120 A1 | 12/2018 | Kakuta et al. | |
| 2019/0137383 A1 | 5/2019 | Umetsu et al. | |
| 2020/0182772 A1* | 6/2020 | Umetsu | G01N 15/1434 |
| 2024/0125711 A1* | 4/2024 | Hilscher | G01N 21/359 |

FOREIGN PATENT DOCUMENTS

| | | |
|---|---|---|
| JP | 2015-025824 A | 2/2015 |
| WO | WO 2017/191699 A1 | 11/2017 |
| WO | WO 2019/049442 A1 | 3/2019 |

\* cited by examiner

INFORMATION PROCESSING APPARATUS, PARTICLE ANALYSIS APPARATUS, INFORMATION PROCESSING METHOD, AND PROGRAM

CROSS-REFERENCE TO RELATED APPLICATIONS

This application claims the benefit under 35 U.S.C. § 371 as a U.S. National Stage Entry of International Application No. PCT/JP2021/000438, filed in the Japanese Patent Office as a Receiving Office on Jan. 8, 2021, which claims priority to Japanese Patent Application Number JP2020-015226, filed in the Japanese Patent Office on Jan. 31, 2020, each of which is hereby incorporated by reference in its entirety.

TECHNICAL FIELD

The present technology relates to an information processing apparatus, a particle analysis apparatus, an information processing method, and a program. More specifically, the present technology relates to an information processing apparatus, a particle analysis apparatus, an information processing method, and a program used in fluorescence analysis for a particle population labeled with a plurality of fluorescent bodies.

BACKGROUND ART

For example, a particle population such as cells is labeled with a fluorescent dye, each particle of the particle population is irradiated with a laser beam, and the intensity and/or pattern of fluorescence generated from the excited fluorescent dye is measured, thereby measuring the characteristics of the particles. As a representative example of the particle analysis apparatus that performs the measurement, a flow cytometer can be mentioned.

In the measurement as described above, a plurality of types of fluorescent dyes is often used to label the particle population. In a case where a plurality of types of fluorescent dyes is used, even when fluorescence generated from a target fluorescent dye is separated by an optical filter, fluorescence generated from a non-target fluorescent dye may leak into a photodetector that detects the separated light. When leakage of fluorescence occurs, fluorescence intensity measured by the photodetector becomes larger than true fluorescence intensity derived from the target fluorescent dye. Therefore, correction for subtracting the fluorescence intensity of the leaking fluorescence is performed.

As a technique related to the correction, for example, Patent Document 1 below discloses a fluorescence intensity correction method including a procedure in which fluorescence generated from a fluorescent dye excited by irradiating microparticles multiply labeled with a plurality of fluorescent dyes having an overlapping fluorescence wavelength band with light is received by photodetectors having different light receiving wavelength bands, the number of which disposed is larger than the number of the fluorescent dyes, and a measurement spectrum obtained by collecting detection values from the respective photodetectors is approximated by a linear sum of single staining spectra obtained by microparticles individually labeled with the respective fluorescent dyes.

CITATION LIST

Patent Document

Patent Document 1: Japanese Patent Application Laid-Open No. 2011-232259

SUMMARY OF THE INVENTION

Problems to be Solved by the Invention

By performing unmixing processing using the spectral reference of each of the plurality of types of fluorescent dyes, it is possible to perform correction of subtracting the fluorescence intensity of the leaking fluorescence from the measured fluorescence intensity. However, there is a case where a two-dimensional plot obtained using the corrected fluorescence data does not become a desired plot. As a cause of this case, for example, a spectral reference prepared in advance does not match the waveform of the spectral reference of the fluorescent dye actually used, or the fluorescent dye used for staining is deteriorated. In order to solve this problem, for example, it is conceivable to modify the waveform of the spectral reference itself, or to match the waveform of the spectral reference with the waveform of the fluorescent dye actually labeling the particles.

In recent years, the number of types of fluorescent dyes used for the measurement has increased, and for example, the number of types of fluorescent dyes is often 10 or more, and may be 20 or more, or may be 30 or more. Accordingly, for example, it is often difficult to grasp the influence on the unmixing processing and the influence on the obtained plot due to modification of the spectral reference of a certain fluorescent dye. Therefore, when the influence can be more easily grasped, it is considered that this can contribute to rapid analysis and/or adjustment of the measurement result.

Furthermore, regarding modification of the spectral reference, modification of the waveform of the spectral reference accompanying intuitive modification of the analysis result (for example, two-dimensional plot) of the acquired fluorescence data may be easier for the user to use than modification of the waveform of the spectral reference itself.

Therefore, a main object of the present technology is to provide a technology for easily grasping the influence of the modification of the spectral reference.

Solutions to Problems

The present technology provides an information processing apparatus including a two-dimensional plot generation unit that generates a two-dimensional plot on the basis of fluorescence data obtained from a particle population labeled with a plurality of fluorescent bodies, and generates a two-dimensional plot group regarding any one fluorescent body of the plurality of fluorescent bodies and each of all the other fluorescent bodies on the basis of correction processing on the two-dimensional plot.

The correction processing may be correction processing based on a user operation on the two-dimensional plot displayed on a display apparatus.

The information processing apparatus can further include an output unit that outputs the generated two-dimensional plot group to the display apparatus.

The information processing apparatus may further include:

a spectral reference modification unit that modifies a spectral reference, in which in the correction processing, the spectral reference modification unit can modify a spectral reference of each fluorescent body corresponding to fluorescence data of a two-dimensional plot subjected to the correction processing.

In the correction processing, the two-dimensional plot generation unit can modify the two-dimensional plot on the basis of fluorescence data subjected to unmixing processing using the modified spectral reference.

The particle population can be a particle population labeled with 10 types or more fluorescent bodies.

The number of two-dimensional plots constituting the generated two-dimensional plot group can be 9 or more.

The fluorescence detection may be fluorescence detection using a flow cytometer.

The output unit can output an alert to the display apparatus in a case where at least one two-dimensional plot of the two-dimensional plot group does not satisfy a predetermined condition.

The output unit can cause the display apparatus to display a list box for selection of any one fluorescent body of the plurality of fluorescent bodies.

The two-dimensional plot generation unit can generate the two-dimensional plot group using a fluorescent body selected from the list box as any one fluorescent body.

Furthermore, the present technology also provides an information processing apparatus including:

a spectral reference modification unit that modifies a spectral reference of each fluorescent body corresponding to fluorescence data of a two-dimensional plot according to a user operation on the two-dimensional plot obtained from a result of fluorescence detection for a particle population labeled with a plurality of fluorescent bodies; and a two-dimensional plot generation unit that generates a two-dimensional plot using fluorescence data obtained by unmixing processing using the modified spectral reference.

The user operation can be a user operation on the two-dimensional plot displayed on the display apparatus.

The spectral reference modification unit can modify the spectral reference according to a drag operation in a direction of any one axis on the two-dimensional plot.

The spectral reference modification unit can modify a spectral reference of a fluorescent body corresponding to fluorescence data constituting the two-dimensional plot.

The two-dimensional plot generation unit can modify a two-dimensional plot displayed on a worksheet in advance using the fluorescence data obtained by the unmixing processing.

Furthermore, the present technology also provides a particle analysis apparatus including a two-dimensional plot generation unit that generates a two-dimensional plot on the basis of fluorescence data obtained from a particle population labeled with a plurality of fluorescent bodies, and generates a two-dimensional plot group regarding any one fluorescent body of the plurality of fluorescent bodies and each of all the other fluorescent bodies on the basis of correction processing on the two-dimensional plot.

Furthermore, the present technology also provides an information processing method including: a two-dimensional plot group generation process of generating a two-dimensional plot on the basis of fluorescence data obtained from a particle population labeled with a plurality of fluorescent bodies, and generating a two-dimensional plot group regarding any one fluorescent body of the plurality of fluorescent bodies and each of all the other fluorescent bodies on the basis of correction processing on the two-dimensional plot.

Furthermore, the present technology also provide a program for causing an information processing apparatus to execute: a two-dimensional plot group generation process of generating a two-dimensional plot group regarding any one fluorescent body of a plurality of fluorescent bodies and each of all the other fluorescent bodies on the basis of correction processing on a two-dimensional plot obtained from a result of fluorescence detection for a particle population labeled with the plurality of fluorescent bodies.

Furthermore, the present technology also provides an information processing apparatus including a two-dimensional plot generation unit that generates a two-dimensional plot group regarding any one fluorescent body of ten or more fluorescent bodies and each of all the other fluorescent bodies from a result of fluorescence detection for a particle population labeled with the ten or more fluorescent bodies.

MODE FOR CARRYING OUT THE INVENTION

Figure 1:
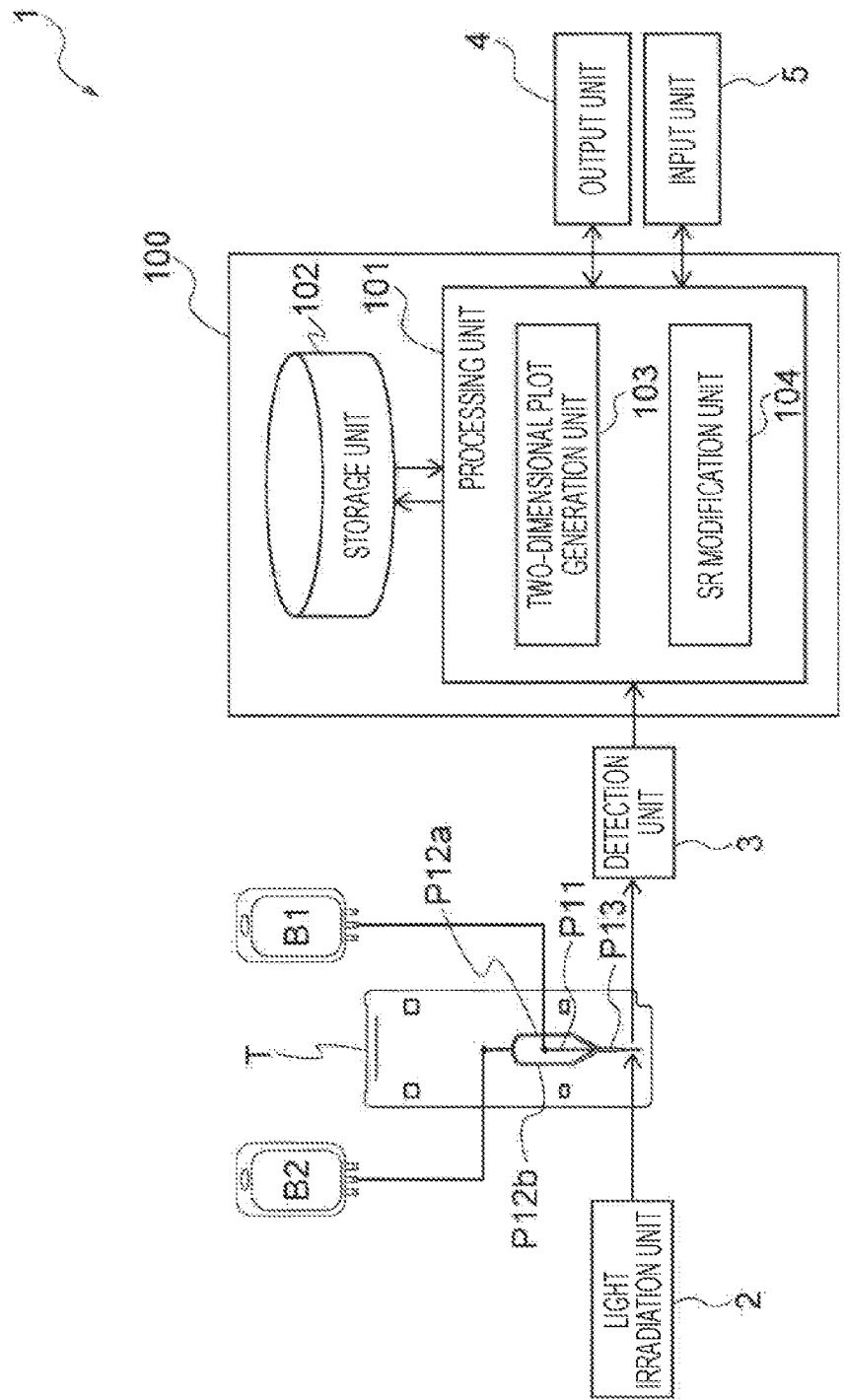
FIG. 1 is a diagram illustrating a configuration example of a particle analysis system including an information processing apparatus according to the present technology.

Preferred aspects for carrying out the present technology are described below. Note that embodiments described below indicate representative embodiments of the present technology, and the scope of the present technology is not limited only to such embodiments. Note that the present technology will be described in the following order.

1. First embodiment (information processing apparatus)
(1) Description of the first embodiment
(2) First example of the first embodiment
(2-1) Light irradiation unit
(2-2) Chip
(2-3) Detection unit (2-4) Information processing apparatus
(2-5) Output unit and input unit
(2-6) Example of processing of fluorescence data by the information processing apparatus
(2-7) Particle population
(2-8) Another embodiment
(2-9) Another embodiment
2. Second embodiment (particle analysis apparatus)
3. Third embodiment (information processing method)
4. Fourth embodiment (program)

1. First Embodiment (Information Processing Apparatus)

(1) Description of the First Embodiment

An information processing apparatus according to the present technology includes a two-dimensional plot generation unit that generates a two-dimensional plot on the basis of fluorescence data obtained from a particle population labeled with a plurality of fluorescent bodies, and generates a two-dimensional plot group regarding any one fluorescent body of the plurality of fluorescent bodies and each of all the other fluorescent bodies on the basis of correction processing on the two-dimensional plot.

The two-dimensional plot generation unit generates a two-dimensional plot group regarding the fluorescent body and each of all the other fluorescent bodies on the basis of the correction processing on the two-dimensional plot. By generating the two-dimensional plot group, the influence of the correction processing can be easily grasped.

In addition, the generation of the two-dimensional plot group is performed on the basis of the correction processing on the two-dimensional plot. The correction processing on the two-dimensional plot makes it easier to visually and intuitively grasp the content of the correction processing as compared with modification of the waveform itself of the spectral reference or modification of a correction coefficient.

As described above, the two-dimensional plot generation unit receives visual and intuitive correction operation on the two-dimensional plot by the user, and generates a two-dimensional plot group for grasping the influence of the correction. Therefore, the two-dimensional plot generation unit contributes to making it easier for the user to grasp the influence of the correction processing on the fluorescence data analysis result. According to the present technology, even in a case where the number of types of fluorescent bodies used particularly in multicolor analysis is large, even in the case of, for example, 10 types or more, particularly 15 types or more, more particularly 20 types or more, and still more particularly 25 types, the influence can be easily grasped.

(2) First Example of the First Embodiment

The information processing apparatus according to the present technology may be configured, for example, as an apparatus that processes fluorescence data obtained in flow cytometry. An example of the information processing apparatus according to the present technology configured as described above and an example of processing by the information processing apparatus will be described below with reference to FIG. 1.

FIG. 1 illustrates a particle analysis system 1 including the information processing apparatus according to the present technology. The particle analysis system includes a light irradiation unit 2, a chip T provided with a flow path through which a particle to be analyzed flows, a detection unit 3, an information processing apparatus 100, an output unit 4, and an input unit 5. The particle analysis system 1 is configured as a system that performs flow cytometry.

(2-1) Light Irradiation Unit

The light irradiation unit 2 is configured to irradiate a predetermined position of the flow path of the chip T with light. When the particle passes through the light irradiation position in the flow path, the particle is irradiated with the light, and as a result, fluorescence is generated. That is, the light can act as excitation light on a particle, particularly a fluorescent body labeling the particle.

The light irradiation unit 2 includes one light source that generates light of a certain wavelength or a plurality of light sources that generates light having mutually different wavelengths, and can preferably include a plurality of light sources that generates light having mutually different wavelengths. The light source can be, for example, a laser light source. Examples of the laser light source include, but not limited to, a semiconductor laser, an argon ion (Ar) laser, a helium-neon (He—Ne) laser, a dye laser, a krypton (Cr) laser, a solid-state laser including a combination of the semiconductor laser and a wavelength conversion optical element, or the like. Particularly preferably, the light irradiation unit 2 can include a combination of a plurality of semiconductor lasers that generates laser beams having mutually different wavelengths.

Furthermore, the light irradiation unit 2 can include a light guide optical system for guiding the light emitted from the light source to a predetermined position in the flow path. The light guide optical system may include, for example, an optical system that multiplexes the light generated by the plurality of light sources. The light guide optical system irradiates a predetermined position in the flow path with light. The number of light irradiation positions may be one or two or more (e.g., two, three, four, or five).

(2-2) Chip

The chip T can be configured as, for example, a flow cell. The chip T is provided with a flow path. The flow path structure provided in the chip T is configured to form, for example, a flow (particularly, a laminar flow) in which particles flow in a substantially line.

The chip T illustrated in FIG. 1 is provided with flow paths P11, P12a, P12b, and P13. From a container (bag) B1 storing a sample liquid containing particles, the sample liquid is introduced into the sample liquid flow path P11. The sample liquid flows through the sample liquid flow path P11 toward the main flow path P13. A sheath liquid is introduced into the chip T from a container (bag) B2 containing the sheath liquid. The sheath liquid flows through the two sheath liquid flow paths P12a and P12b toward the main flow path P13. The sample liquid flow path P11 and the sheath liquid flow paths P12a and P12b are configured to be joined to form the main flow path P13. The sample liquid fed in the sample liquid flow path P11 and the sheath liquid fed in the sheath liquid flow paths P12a and P12b merge at a point where the three flow paths join, and then flow in the main flow path P13. In the main flow path P13, for example, a laminar flow in which the sample liquid is sandwiched by the sheath liquid flows. In the laminar flow, particles are arranged in substantially a line. The particles flowing side by side in the main flow path P13 are irradiated with the excitation light generated by the light irradiation unit 2, and the resulting light is detected by the detection unit 3.

The chip T may have a two-dimensional or three-dimensional flow path structure. The chip T can have a substrate shape formed of a plastic material or a glass material. The chip T and the flow path structure provided in the chip T are not limited to those illustrated in FIG. 1, and for example, a chip and a flow path structure known in the technical field related to flow cytometers may be adopted. That is, in the present technology, the fluorescence detection may be, for example, fluorescence detection by a flow cytometer.

The shape of the cross-section of the flow path provided in the chip T may be, for example, circular, elliptical, or rectangular (square or oblong). In a case where the cross-section of the flow path is circular or elliptical, the diameter or major axis may be, for example, 1 mm or less, and particularly 10 μm or more and 1 mm or less. In a case where the cross-section of the flow path is square or oblong, the length of one side or a long side may be, for example, 1 mm or less, and particularly 10 μm or more and 1 mm or less.

The particles coming out of the chip T may be separated. For example, by vibrating the chip with a vibration element such as a piezoelectric vibration element, a droplet containing one particle can be generated from an ejection port. By charging the droplet with a charging unit, the traveling direction can be controlled, and the particle can be separated. As described above, the particle analysis system 1 may be configured as a system having a sorting function.

Furthermore, as the chip T, a chip provided with a separation mechanism in the chip may be used. As an example of such a chip, for example, a microparticle separation microchip described in Japanese Patent Application Laid-Open No. 2019-174192 can be exemplified. With the chip, the particles in the sample liquid can be separated without coming into contact with the outside air, that is, the closed type separation operation can be performed.

As described above, the particle analysis system 1 may include the separation unit that separates a particle. The separation unit can separate a particle on the basis of the result of the fluorescence detection by the detection unit.

(2-3) Detection Unit

The detection unit 3 is configured to detect fluorescence generated by irradiating the particles flowing in the flow path of the chip T with light. The detection unit 3 may further detect scattered light (for example, any one or more of forward scattered light, backward scattered light, and side scattered light) in addition to detecting fluorescence.

The detection unit 3 includes one or a plurality of photodetectors. The photodetector may include a PMT (photomultiplier tube) and/or a photodiode, and can particularly include one or a plurality of PMTs. The photodetector can include, for example, a PMT array in which a plurality of PMTs is arranged in, for example, a one-dimensional direction. The number of PMTs included in the photodetector may be, for example, 2 or more, 5 or more, 8 or more, 10 or more, 15 or more, 20 or more, 22 or more, 24 or more, or 26 or more. The number of PMTs included in the photodetector may be, for example, 50 or less, 45 or less, or 40 or less.

The photodetector can include a spectroscopic optical system that disperses fluorescence. The spectroscopic optical system can be configured to, for example, disperse fluorescence and cause light having a predetermined detection wavelength to reach a PMT to which the predetermined detection wavelength is allocated.

Furthermore, the detection unit 3 may include one or more measuring instruments selected from a fluorescence measuring instrument, a scattered light measuring instrument, a transmitted light measuring instrument, a reflected light measuring instrument, a diffracted light measuring instrument, an ultraviolet spectrometer, an infrared spectrometer, a Raman spectrometer, a FRET measuring instrument, and a FISH measuring instrument. Furthermore, the detection unit 3 may include, for example, a two-dimensional light receiving element such as a CCD or a CMOS.

The detection unit 3 can include a signal processing unit. The signal processing unit converts the output obtained by the photodetector into a digital signal. The signal processing unit may include, for example, an A/D converter as an apparatus that performs the conversion. A fluorescence signal detected by the photodetector can be converted into a digital signal by the signal processing unit and then the digital signal can be transmitted to a processing unit 101. Alternatively, the fluorescence signal may be converted into a digital signal by the signal processing unit and then the digital signal may be stored in a storage unit 102. The digital signal can be handled as fluorescence data by the processing unit 101 and used, for example, for two-dimensional plot generation by the processing unit 101 or subjected to unmixing processing by the processing unit 101. The fluorescence data can include data related to fluorescence intensity.

The detection unit 3 (particularly, the photodetector) is disposed at a position where fluorescence generated from the particle can be detected. For example, as illustrated in FIG. 1, the detection unit 3 may be disposed so as to sandwich the chip T (particularly, the main flow path P13) between the light irradiation unit 2 and the detection unit 3, or the detection unit 3 may be disposed on the same side as the light irradiation unit 2 with respect to the chip T.

(2-4) Information Processing Apparatus

The information processing apparatus 100 includes, for example, the processing unit 101 and the storage unit 102.

The processing unit 101 processes the fluorescence data (for example, fluorescence intensity data or the like) acquired by the detection unit 3. An example of processing of the fluorescence data by the processing unit 101 will be described in (2-6) below.

The storage unit 102 stores various data. The storage unit 102 may be configured to be able to store, for example, the fluorescence data acquired by the detection unit 3. The storage unit 102 may be further configured to be able to store spectral reference data.

The processing unit 101 includes a two-dimensional plot generation unit 103 and a spectral reference modification unit 104.

The two-dimensional plot generation unit 103 performs processing of generating a two-dimensional plot on the basis of the fluorescence data. Furthermore, the two-dimensional plot generation unit 103 may perform processing of causing the output unit 4 to output the two-dimensional plot, and, in particular, can cause a display apparatus to display the two-dimensional plot.

The spectral reference modification unit 104 performs processing of modifying the spectral reference data. The modification can be performed, for example, according to a correction operation of the two-dimensional plot by the user. In the present specification, the spectral reference modification unit is also referred to as an SR modification unit. Furthermore, in the present specification, the spectral reference is also referred to as the SR.

The two-dimensional plot generation unit 103 and the spectral reference modification unit 104 will be described in more detail in (2-6) below.

The processing unit 101 can control the output unit 4 to output the processing result of the fluorescence data. Furthermore, the processing unit 101 can receive a signal from the input unit 5 (for example, an operation signal generated by the operation of the input unit 5 by the user), and can execute various types of processing or control the information processing apparatus 100 on the basis of the signal.

A configuration example of the information processing apparatus 100 will be described below. The processing by the processing unit 101 can be realized by, for example, the configuration described below, but the configuration of the information processing apparatus 100 is not limited to the configuration described below.

The information processing apparatus 100 may include, for example, a central processing unit (CPU), RAM, and ROM. The CPU, the RAM, and the ROM may be connected to each other via a bus. An input/output interface may be further connected to the bus. The output unit 4 and the input unit 5 can be connected to the bus via the input/output interface.

For example, a communication apparatus, a storage apparatus, and a drive may be further connected to the input/output interface.

The communication apparatus connects the information processing apparatus 100 to a network by wire or wirelessly. Using the communication apparatus, the information processing apparatus 100 can acquire various data (for example, fluorescence data and/or SR data) via the network. The acquired data can be stored in, for example, a storage unit 2. A type of the communication apparatus may be appropriately selected by a person skilled in the art.

The storage apparatus can store an operating system (for example, WINDOWS (registered trademark), UNIX (registered trademark), LINUX (registered trademark), or the like), a program and other various programs for causing the information processing apparatus (or the particle analysis apparatus or the particle analysis system) to execute the information processing method according to the present technology, and fluorescence data, SR data, and other various data.

The drive can read data (for example, fluorescence data, SR data, or the like) or a program recorded in a recording medium and output the data or the program to the RAM. The recording medium is, for example, but is not limited to, a micro SD memory card, an SD memory card, or flash memory.

(2-5) Output Unit and Input Unit

The output unit 4 can include, for example, an apparatus that outputs a result of processing of the fluorescence data by the processing unit 101. The output unit 4 can output, for example, the two-dimensional plot group generated by the two-dimensional plot generation unit 103 to the display apparatus (display).

The output unit 4 can output an alert to the display apparatus, for example, in a case where at least one two-dimensional plot of the two-dimensional plot group does not satisfy a predetermined condition. The alert may be those generated in step S309 described in "(2-6) Example of processing of fluorescence data by the information processing apparatus" below. Furthermore, the output unit 4 can cause the display apparatus to display a list box for selection of any one fluorescent body of the plurality of fluorescent bodies. The list box may be those described regarding in step S207 described in "(2-6) Example of processing of fluorescence data by the information processing apparatus" below. The display apparatus can output a result of processing the fluorescence data as an image (a still image or a moving image). Furthermore, the output unit 4 can include, for example, a printing apparatus. The printing apparatus can print and output a result of the processing of the fluorescence data on a print medium such as paper.

The input unit 5 is, for example, an apparatus that receives an operation by the user. The input unit 5 can include, for example, a mouse, a keyboard, or a display (in this case, the user operation may be a touch operation on the display). The input unit 5 transmits an operation by the user to the information processing apparatus 100 as an electric signal. The processing unit 101 of the information processing apparatus 100 can perform various types of processing according to the electrical signal.

Figure 2:
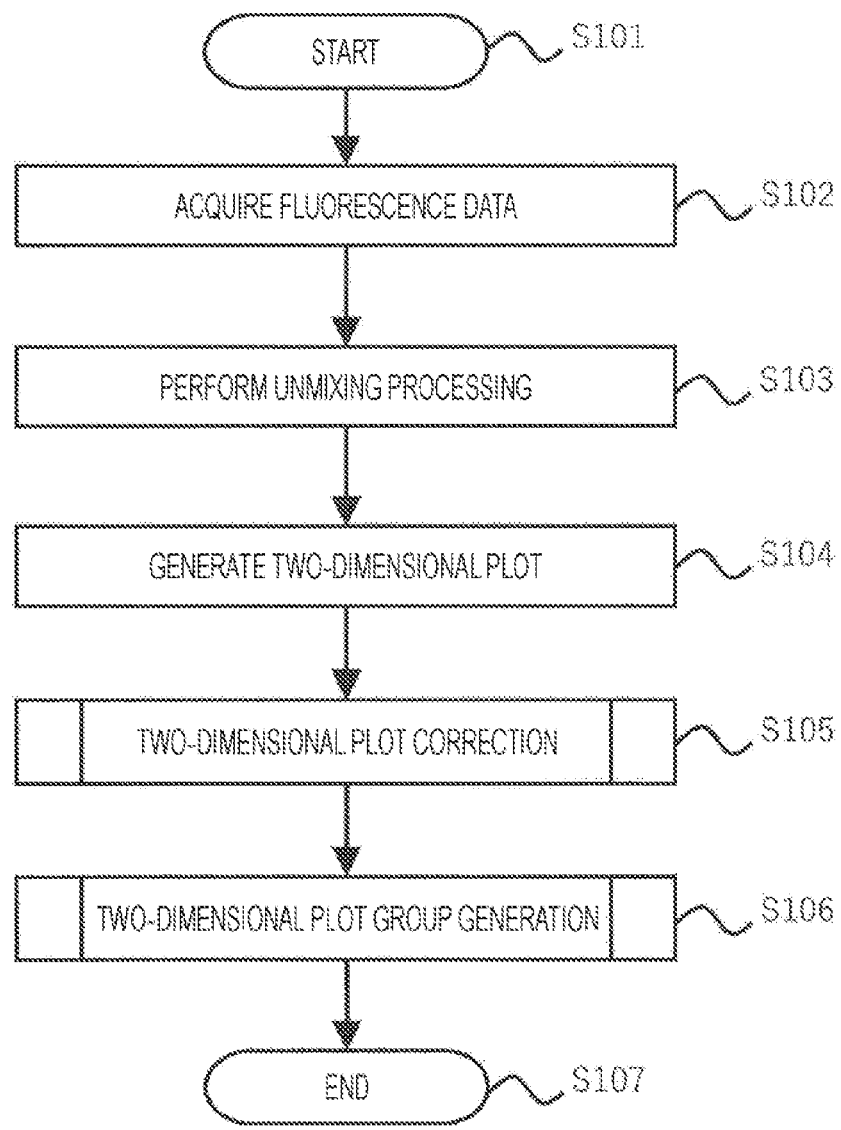
FIG. 2 is an example of a flowchart of processing by the information processing apparatus according to the present technology.

(2-6) Example of Processing of Fluorescence Data by the Information Processing Apparatus An example of processing of fluorescence data by the information processing apparatus 100 will be described below with reference to FIG. 2. FIG. 2 is an example of a flowchart of processing of fluorescence data by the information processing apparatus 100.

In step S101, the information processing apparatus 100 starts the processing of the fluorescence data. For example, in response to the user clicking a predetermined processing start button displayed on the display of the output unit 4, the processing unit 101 displays a window for processing the fluorescence data on the display.

Note that prior to the start of the processing of the fluorescence data, fluorescence detection (particularly, flow cytometry) may be performed on a particle population labeled with a plurality of fluorescent bodies by using the light irradiation unit 2, the chip T, and the detection unit 3 described above, and fluorescence data acquired as a result may be stored in the storage unit 102.

In step S102, the processing unit 101 acquires the fluorescence data regarding the particle population. The processing unit 101 can receive, for example, the fluorescence data acquired by the detection unit 3. Alternatively, the processing unit 101 may acquire the fluorescence data stored in the storage unit 102.

In step S103, the processing unit 101 performs unmixing processing on the fluorescence data acquired in step S102. The unmixing processing is also called fluorescence separation processing. The processing unit 101 can perform the unmixing processing using, for example, a least square method (LSM), more preferably a weighted least square method (WLSM). The unmixing processing using the least square method may be performed using, for example, a fluorescence intensity correction method described in Japanese Patent No. 5985140 The fluorescence intensity correction method can be performed using, for example, Formula (1) of WLSM described below.

[Math. 1]

$$\begin{bmatrix} x_1 \\ \vdots \\ x_n \end{bmatrix} = ([S^T][L][S])^{-1}[S^T][L]\begin{bmatrix} y_1 \\ \vdots \\ y_m \end{bmatrix} \quad (1)$$

$$L = \begin{bmatrix} \lambda_1 & 0 & 0 \\ 0 & \ddots & 0 \\ 0 & 0 & \lambda_m \end{bmatrix}, \lambda_i = \frac{1}{\max(y_i, 0) + \text{offset}},$$

In Formula (1) described above, $x_n$ represents the fluorescence intensity of the n-th fluorescent dye, $[S^T]$ represents a transposed matrix of spectral reference, $[L]$ represents a weight matrix, $[S]$ represents a matrix of spectral reference, $y_i$ represents a measurement value by the i-th photodetector, $\lambda_i$ represents a weight at the i-th photodetector, $\max(y_i,0)$ represents a larger value by comparing the detection value of the i-th detector with zero, and offset' represents a value determined on the basis of the detection value of each detector.

There is a case where the fluorescence wavelength distribution of the fluorescent body (for example, fluorescent dye) is wide. Therefore, for example, a PMT used for detecting the fluorescence generated from a certain fluorescent body can also detect the fluorescence generated from another fluorescent body. Therefore, the output from each PMT is corrected so as to be the output caused only by the fluorescence derived from the target fluorescent body for each PMT. The unmixing processing is a method for the correction.

In step S103, the processing unit 101 can perform the unmixing processing using the spectral reference data of each of the plurality of fluorescent dyes. The spectral reference data may be stored in the storage unit 102 in advance. The processing unit 101 can acquire the spectral reference data from, for example, the storage unit 102 and then perform the unmixing processing.

In the present specification, the spectral reference data (also referred to as the SR data) is spectrum data of fluorescence generated when each fluorescent body is irradiated with predetermined excitation light. The SR data is obtained, for example, by detecting, with the photodetector, fluorescence generated by irradiating the particle labeled with each fluorescent body alone with predetermined excitation light.

In step S104, the user performs gate setting and developing operations so as to generate a two-dimensional plot related to desired two fluorescent bodies among the plurality of fluorescent bodies used for labeling the particle population. The gate setting and developing operations can be appropriately determined by the user according to the purpose of analysis. In step S104, the two-dimensional plot generation unit 103 generates a two-dimensional plot related to the two fluorescent bodies according to the operation. More specifically, the two-dimensional plot generation unit 103 can generate a two-dimensional plot on the basis of the gate set by the user and the two fluorescent bodies selected by the user using the fluorescence data after the unmixing processing in step S103. The vertical axis of the two-dimensional plot may be fluorescence data (in particular, fluorescence intensity) of fluorescence corresponding to one fluorescent body of the two fluorescent bodies, and the horizontal axis may be fluorescence data (in particular, fluorescence intensity) of fluorescence corresponding to the other fluorescent body. The two-dimensional plot may be, for example, a density plot (dot plot), a contour plot, or a plot of both density and contour.

In step S104, the number of two-dimensional plots generated may be one or may be plural (e.g., 2 or more, in particular 2 to 30, more in particular 2 to 20). Furthermore, in step S104, in addition to the two-dimensional plot regarding the two fluorescent bodies, a plot based on scattered light (for example, any two of forward scattered light, side scattered light, and backward scattered light) and/or a plot based on scattered light and fluorescence may be generated. These plots may be generated by, for example, the two-dimensional plot generation unit 103.

In step S104, the two-dimensional plot generation unit 103 causes the display apparatus to display the generated one or plurality of two-dimensional plots. The one or plurality of two-dimensional plots generated in step S104 can be displayed, for example, on one window or worksheet. The plurality of two-dimensional plots generated in step S104 may be displayed separately on two or more windows or worksheets.

Figure 3:
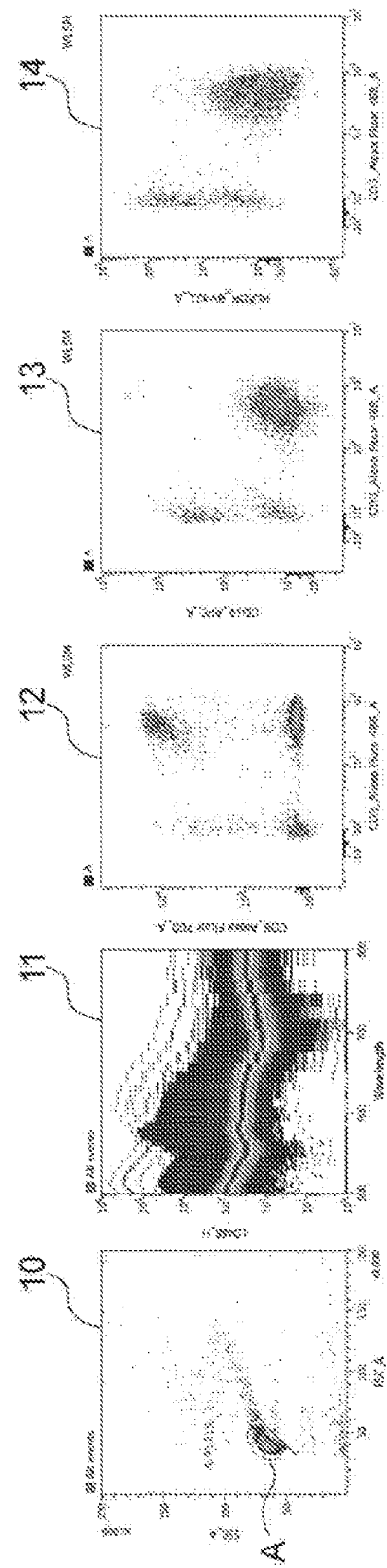
FIG. 3 is a diagram illustrating an example of screen display of an analysis result of fluorescence data.

A specific example of the operation in step S104 will be described with reference to FIG. 3. The two-dimensional plot generation unit 103 generates a scattered light plot 10 obtained by plotting all events on the basis of side scattered light (SSC) data and forward scattered light (FSC) data, and a spectral plot 11. Then, the user can set a gate A in the scattered light plot 10 and perform a developing operation on the gate A to generate a two-dimensional plot regarding desired two fluorescent bodies. By this operation, for example, a two-dimensional plot 12 illustrated in FIG. 3 is generated. Similarly, the user performs a developing operation on the gate A to generate a two-dimensional plot regarding a combination of the other two fluorescent bodies, thereby generating, for example, two-dimensional plots 13 and 14 illustrated in FIG. 3.

The user checks the two-dimensional plots generated in step S104, and as a result, for example, wants to correct one of the plots. In this case, two-dimensional plot correction processing is performed in step S105, and next, two-dimensional plot group generation processing is performed in step S106. The two-dimensional plot correction processing can be correction processing based on a user operation on the two-dimensional plot displayed on the display apparatus. The two-dimensional plot group generation processing can be processing of generating a group of two-dimensional plots of one fluorescent body and each of all the fluorescent bodies other than the one fluorescent body on the basis of the correction processing.

Figure 4A:
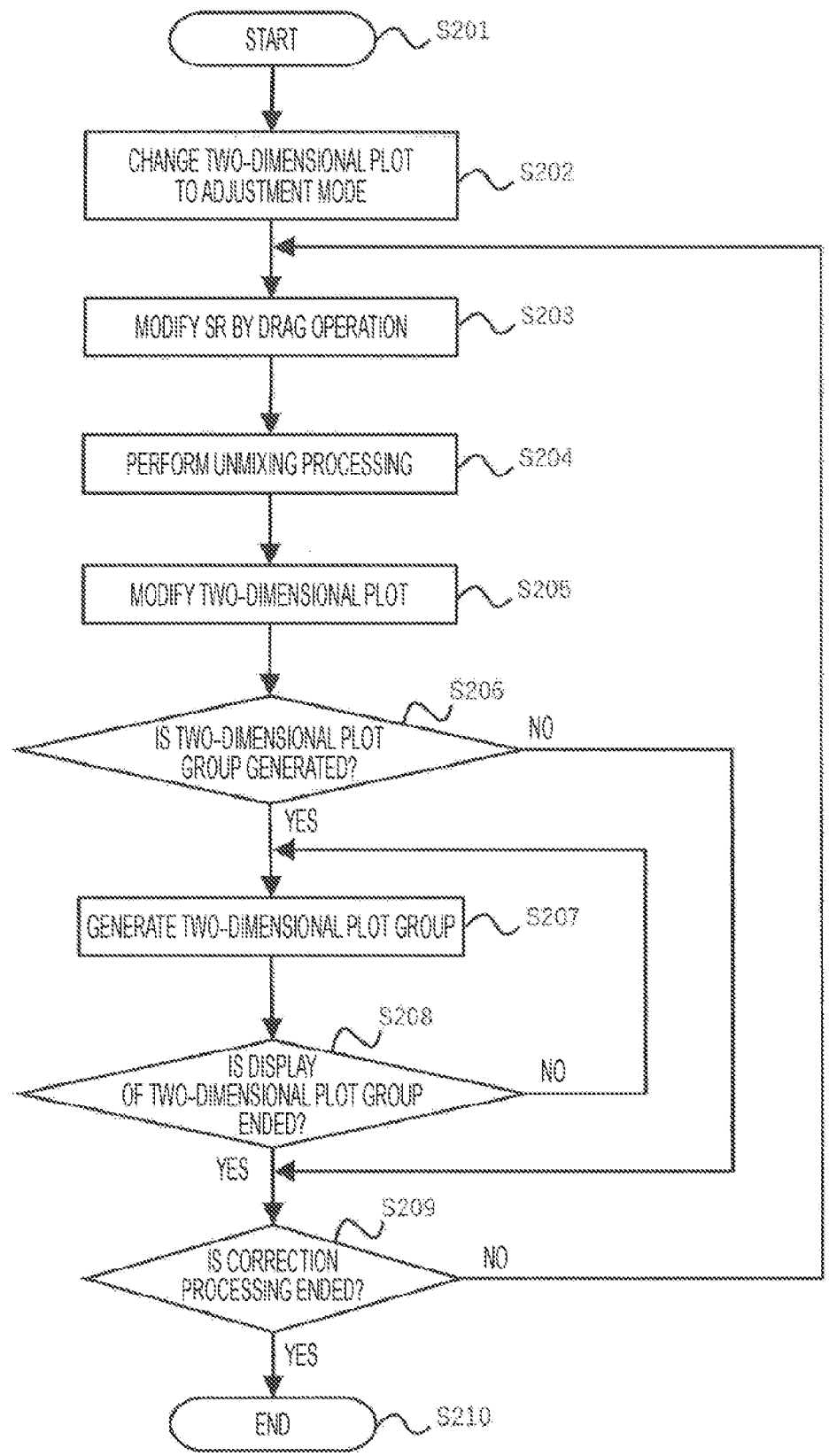
FIG. 4A is an example of a flowchart of processing by the information processing apparatus according to the present technology.

Hereinafter, details of steps S105 and S106 will be described with reference to FIG. 4A. FIG. 4A illustrates an example of a flowchart of the two-dimensional plot correction processing and the two-dimensional plot group generation processing. Steps S201 to S205 in FIG. 4A correspond to the details of step S105. Steps S206 to 208 in FIG. 4A correspond to the details of step S106.

In step S201, the processing unit 101 starts the two-dimensional plot correction processing in response to the user performing a predetermined correction processing start operation. The correction processing start operation may be, for example, clicking a correction processing start button in a window or worksheet that displays the two-dimensional plot generated in step S104 or a correction processing start button in another window or worksheet.

Figure 5:
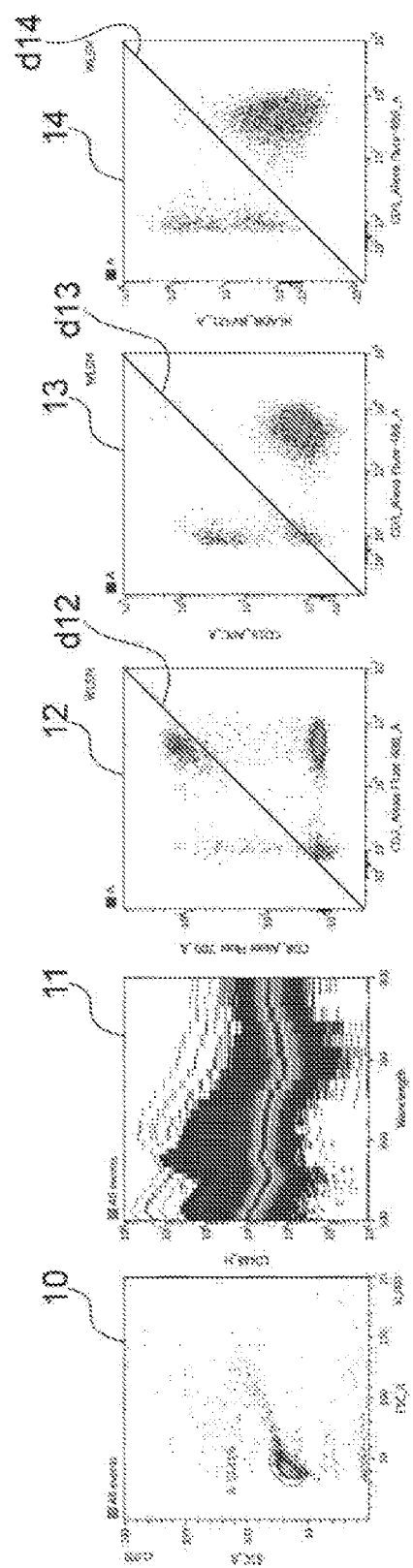
FIG. 5 is a diagram illustrating an example of screen display of an analysis result of fluorescence data.

In step S202, the processing unit 101 shifts the two-dimensional plot generated in step S104 to an adjustment mode in response to the correction processing start operation step S201 being performed by the user. In order to indicate the shift to the adjustment mode on the display, the processing unit 101 performs, for example, predetermined decoration on the two-dimensional plot. The predetermined decoration may be display of a diagonal line from a lower left corner to an upper right corner in the two-dimensional plot. For example, among the plots illustrated in FIG. 3, the diagonal line is displayed in the two-dimensional plots 12 to 14. The two-dimensional plots 12 to 14 to which the diagonal line is added are illustrated in FIG. 5. As illustrated in FIG. 5, diagonal lines d12, d13, and d14 are added to the two-dimensional plots 12, 13, and 14, respectively. The diagonal line makes it easy to confirm whether a two-dimensional plot desired by the user has been obtained.

A display for indicating a direction of an adjustment operation of the plot may be added in the two-dimensional plot shifted to the adjustment mode. An example of such a display will be described with reference to FIGS. 6A and 6B.

The two-dimensional plot to which the display of the diagonal line described above is added is divided into an upper left half triangle and a lower right half triangle relative to the diagonal line.

For example, in response to the user moving the mouse pointer into the triangular area in the lower right half, the processing unit 101 causes the display to display a display indicating an adjustable direction in the triangular area in the lower right half. The display may be, for example, an arrow display such as an arrow 60 in FIG. 6A. As indicated by the arrow 60, the adjustable direction in the triangular area in the lower right half can be a vertical axis direction.

Furthermore, in response to the user moving the mouse pointer into the triangular area in the upper left half, the processing unit 101 causes the display to display a display indicating an adjustable direction in the triangular area in the upper left half. The display may be, for example, an arrow display such as an arrow 61 in FIG. 6B. As indicated by the arrow 61, the adjustable direction in the triangular area in the upper left half can be a horizontal axis direction.

Such display makes it easy for the user to grasp the adjustable direction.

In step S203, for example, it is assumed that the user performs an operation on the two-dimensional plot displayed on the display apparatus. The operation may be, for example, a drag operation of the mouse pointer on the two-dimensional plot. The processing unit 101 corrects the two-dimensional plot on the basis of the operation. The correction processing based on the operation can include, for example, SR modification processing in step S203, unmixing processing in step S204, and two-dimensional plot modification processing in step S205. Specific examples of these pieces of processing will be described below.

In step S203, the SR modification unit modifies the SR of each fluorescent body. For example, in step S203, in response to the user operation on the two-dimensional plot by the user (for example, in response to the user performing a drag operation of the mouse pointer on the two-dimensional plot), an SR modification unit 104 modifies the SR data of the fluorescent body corresponding to the fluorescence data of the two-dimensional plot (that is, the two-dimensional plot subjected to the correction processing). More specifically, the SR modification unit 104 modifies the SR data of the fluorescent body corresponding to the fluorescence data constituting the two-dimensional plot on the basis of the movement amount or the drag operation amount of the mouse pointer.

A more specific example of the SR modification processing in step S203 will be described below.

Figure 6A:
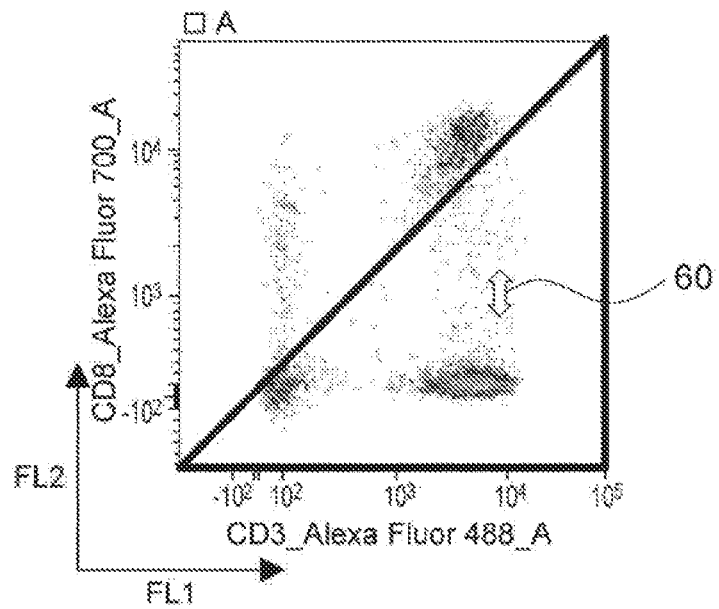
FIG. 6A is a display example of a two-dimensional plot presented by the information processing apparatus according to the present technology.
Figure 6B:
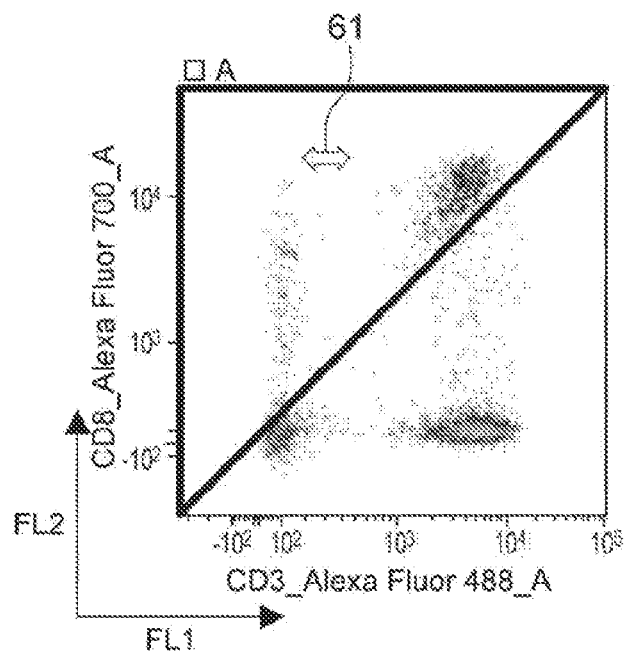
FIG. 6B is a display example of a two-dimensional plot presented by the information processing apparatus according to the present technology.

The SR modification unit 104 modifies the SR data of the fluorescent body corresponding to the fluorescence data constituting the two-dimensional plot in response to the user performing a drag operation of the mouse pointer in the vertical axis direction within the triangular area in the lower right half of FIG. 6A. In particular, the SR data of the fluorescent body corresponding to the fluorescence intensity data on the vertical axis of the two-dimensional plot and the SR data of the fluorescent body corresponding to the fluorescence intensity data on the horizontal axis of the two-dimensional plot can be modified. Preferably, the modification is performed on the basis of the drag operation amount of the mouse pointer or the movement amount of the mouse pointer in the vertical axis direction in the area by the user. Therefore, the SR data can be intuitively modified by the mouse operation.

The SR modification unit 104 can modify the SR data, for example, so as to satisfy the relationship described below.

In a case where the mouse is dragged downward:

(Increase amount of fluorescence intensity at predetermined wavelength in SR data of fluorescent body on horizontal axis)=(movement distance ratio)×(adjustment coefficient)×(fluorescence intensity at the predetermined wavelength in SR data of fluorescent body on vertical axis)

In a case where the mouse is dragged upward:

(Reduction amount of fluorescence intensity at predetermined wavelength in SR data of fluorescent body on horizontal axis)=(movement distance ratio)×(adjustment coefficient)×(fluorescence intensity at the predetermined wavelength in SR data of fluorescent body on vertical axis)

In the above relationship, the "movement distance ratio" is a ratio of a distance due to the drag operation or movement of the mouse pointer to the plot size. The "adjustment coefficient" may be set on the basis of the relationship between the fluorescence intensities of the fluorescent bodies on the horizontal axis and the vertical axis of the two-dimensional plot.

The SR data may be modified over the entire range of wavelength of the SR data, or may be modified over a partial range of wavelength of the SR data.

The SR modification unit 104 modifies the SR data of the fluorescent body corresponding to the fluorescence data constituting the two-dimensional plot in response to the user performing the drag operation of the mouse pointer in the horizontal axis direction within the triangular area in the upper left half. Also in this case, in particular, the SR data of the fluorescent body corresponding to the fluorescence intensity data on the vertical axis of the two-dimensional plot and the SR data of the fluorescent body corresponding to the fluorescence intensity data on the horizontal axis of the two-dimensional plot can be modified. Preferably, the modification is performed on the basis of the drag operation amount of the mouse pointer or the movement amount of the mouse pointer in the horizontal axis direction in the area by the user. Therefore, the SR data can be intuitively modified by the mouse operation.

The SR modification unit 104 can modify the SR data, for example, so as to satisfy the relationship described below.

In a case where the mouse is dragged leftward:

(Increase amount of fluorescence intensity at predetermined wavelength in SR data of fluorescent body on vertical axis)=(movement distance ratio)×(adjustment coefficient)×(fluorescence intensity at the predetermined wavelength in SR data of fluorescent body on horizontal axis)

In a case where the mouse is dragged rightward:

(Reduction amount of fluorescence intensity at predetermined wavelength in SR data of fluorescent body on vertical axis)=(movement distance ratio)×(adjustment coefficient)×(fluorescence intensity at the predetermined wavelength in SR data of fluorescent body on horizontal axis)

In the relationship described below, the "movement distance ratio" is a ratio of a distance due to the drag operation or movement of the mouse pointer to the plot size. The "adjustment coefficient" may be set on the basis of the relationship between the fluorescence intensities of the fluorescent bodies on the horizontal axis and the vertical axis of the two-dimensional plot.

The SR data may be modified over the entire range of wavelength of the SR data, or may be modified over a partial range of wavelength of the SR data.

As described above, the information processing apparatus according to the present technology can include the SR modification unit that modifies the SR. The SR modification unit modifies the SR data according to a user operation on the two-dimensional plot (more particularly, the drag operation on the two-dimensional plot by the user), and particularly modifies the SR according to the drag operation in a direction of any one axis on the two-dimensional plot.

For example, the SR modification unit can modify the SR data on the basis of the drag operation amount or the movement amount of the mouse pointer. For example, the SR modification unit can modify the SR data of the fluorescent body associated with any one of the two axes of the two-dimensional plot on the basis of the drag operation amount or the mouse pointer movement amount on the two-dimensional plot in the axis direction.

Figure 9:
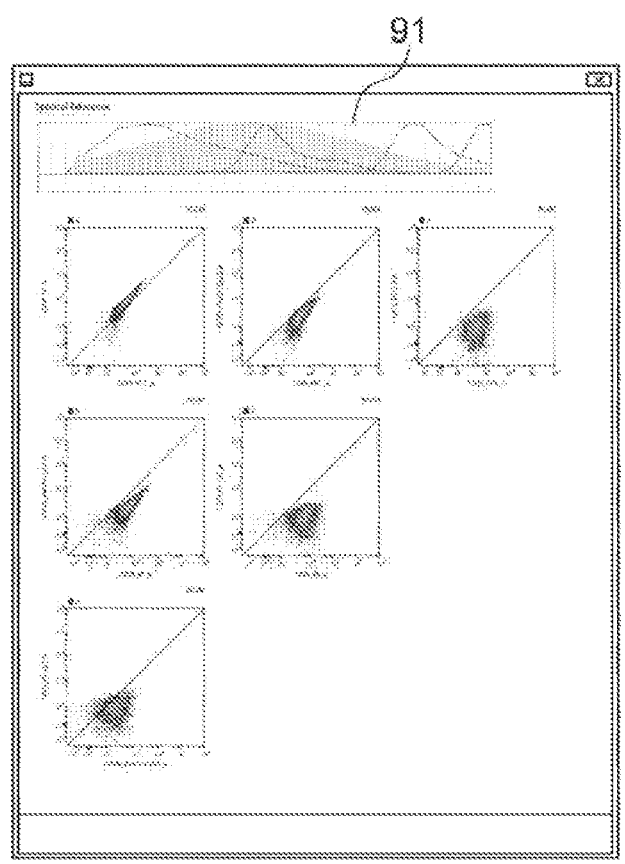
FIG. 9 is a diagram illustrating an example of how to display spectrum data.

According to shifting to the adjustment mode in step S202, the processing unit 101 may display the waveform of the SR of each fluorescent body associated with the fluorescence intensity of the axis of the generated two-dimensional plot (two-dimensional plot displayed on the display) on the display. For example, the processing unit 101 can display the waveform of the SR at any position in the window or worksheet where the two-dimensional plot is displayed. For example, as illustrated in FIG. 9, a waveform 91 of the SR can be displayed at the top of the window.

The SR modification unit 104 may modify the displayed waveform of the SR in response to the user operation or in response to the modification of the SR data.

By displaying the waveform of the SR and displaying the modification of the SR waveform as described above, the user can easily grasp the influence of the user operation on the SR waveform.

Preferably, the SR modification unit 104 can modify the two-dimensional plot on the display such that the waveform of the SR displayed on the display is modified in conjunction with the user operation on the two-dimensional plot in step S203. For such modification on the display, the processing unit 101 can perform steps S203 and S204 substantially simultaneously. Performing these steps "substantially simultaneously" can mean that steps S203 and S204 are performed sequentially to the extent that the user viewing the display does not recognize that there is a time lag between steps S203 and S204.

In step S204, the processing unit 101 performs unmixing processing using the SR data modified in step S203. The unmixing processing may be the same as the unmixing processing in step S103 except that SR data to be used is different.

In step S205, the two-dimensional plot generation unit 103 modifies the two-dimensional plot on the basis of the fluorescence data after the unmixing processing in step S204. The two-dimensional plot generation unit 103 can display the two-dimensional plot modified using the fluorescence data after the unmixing processing on the display.

In step S205, the two-dimensional plot to be modified by the two-dimensional plot generation unit 103 may be, for example, the two-dimensional plot subjected to the drag operation in step S203.

Furthermore, in addition to the two-dimensional plot subjected to the drag operation, a two-dimensional plot other than the two-dimensional plot subjected to the drag operation may also be subjected to the modification in step S205. For example, the two-dimensional plot generation unit 103 may modify a plurality of two-dimensional plots displayed on the worksheet in advance (a two-dimensional plot subjected to the drag operation and one or a plurality of two-dimensional plots other than the two-dimensional plot) using fluorescence data obtained by the unmixing processing.

Preferably, in step S205, the two-dimensional plot generation unit 103 can modify all the two-dimensional plots generated in step S104 on the basis of the fluorescence data after the unmixing processing in step S204. For example, in a case where the two-dimensional plot 12 in FIG. 5 is subjected to the drag operation in step S203, the two-dimensional plot generation unit 103 can also modify the two-dimensional plots 13 and 14 in addition to the two-dimensional plot 12 in step S205.

Preferably, the processing unit 101 can modify the two-dimensional plot on the display such that the modification of the two-dimensional plot in step S205 is performed in conjunction with the user operation on the two-dimensional plot in step S203. For such modification on the display, the processing unit 101 can perform steps S203 and S205 substantially simultaneously. Performing these steps "substantially simultaneously" can mean that steps S203 and S205 are performed sequentially to the extent that the user viewing the display does not recognize that there is a time lag between steps S203 and S205.

An example of a change on the screen of the display apparatus as a result of the processing in steps S203, S204, and S205 will be described with reference to FIG. 8.

Figure 8:
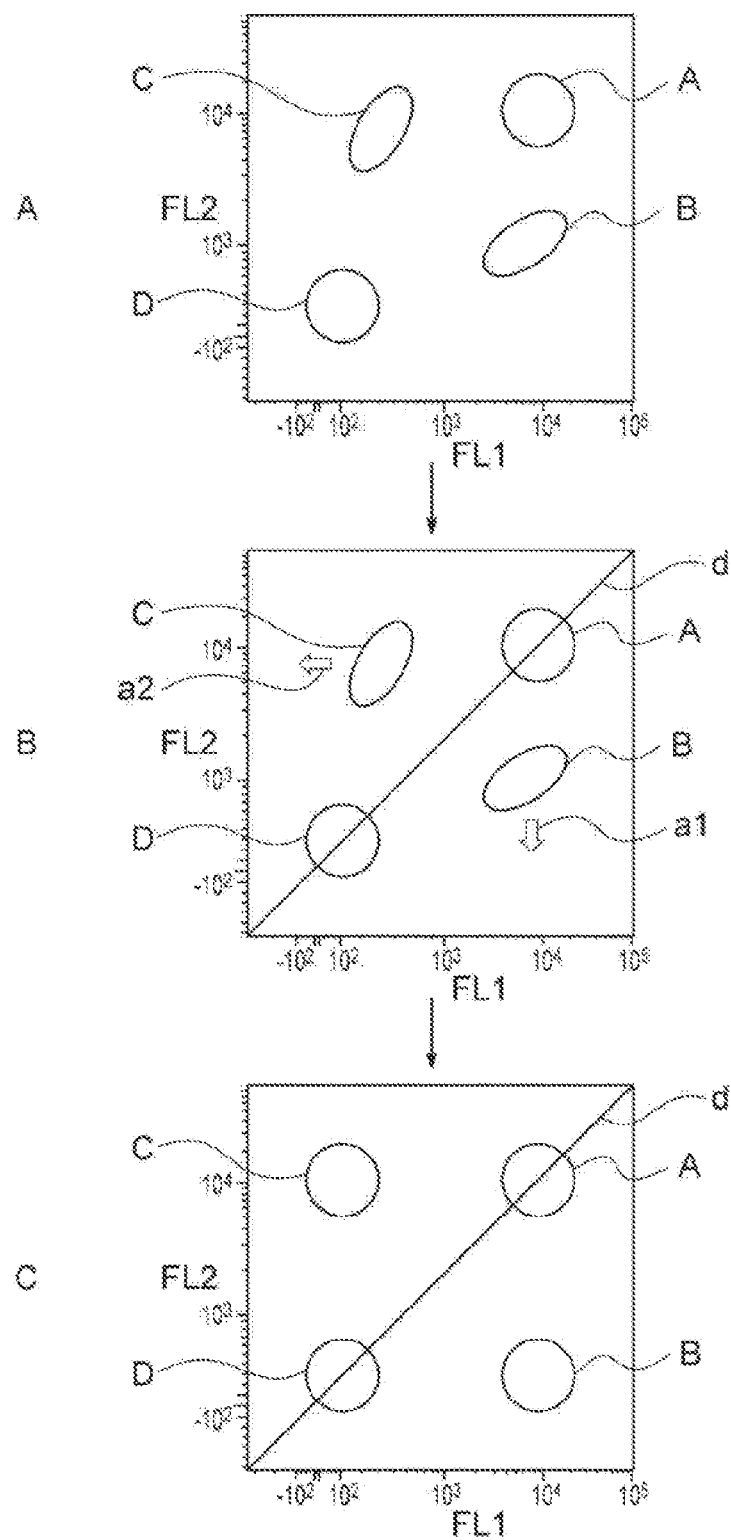
FIG. 8 is a schematic diagram illustrating an example of correction of a two-dimensional plot by the information processing apparatus according to the present technology.

It is assumed that the two-dimensional plot illustrated in A of FIG. 8 is generated. In the two-dimensional plot, the fluorescence intensity of FL1 is plotted on the horizontal axis, and the fluorescence intensity of FL2 is plotted on the vertical axis. In the two-dimensional plot, there are four sets of events (A to D). A set of events A is a set of events that have caused the fluorescence of FL1 and have caused the fluorescence of FL2. A set of events B is a set of events that have caused the fluorescence of FL1 but have not caused the fluorescence of FL2. A set of events C is a set of events that have not caused the fluorescence of FL1 but have caused the fluorescence of FL2. A set of events D is a set of events that have not caused the fluorescence of FL1 or have not caused the fluorescence of FL2.

The user checks the two-dimensional plot illustrated in A and knows that the shapes and positions of the sets of events B and C are different from the assumed shapes and positions. Therefore, the user decides to correct this two-dimensional plot and shifts the two-dimensional plot to the adjustment mode as described above. Therefore, as illustrated in B of FIG. 8, a diagonal line d is displayed in the two-dimensional plot.

Then, the user drags the mouse pointer in the direction of an arrow a1 within the lower right half area divided by the diagonal line d. Therefore, the set of events B also moves in the direction of the arrow a1. Furthermore, as a result of the movement, the shape of the set of events B also changes from the elliptical shape to the circular shape.

Furthermore, the user drags the mouse pointer in the direction of an arrow a2 within the upper left half area divided by the diagonal line d. Therefore, the set of events C also moves in the direction of the arrow a2. Furthermore, as a result of the movement, the shape of the set of events C also changes from the elliptical shape to the circular shape.

A two-dimensional plot after the drag operation described above is performed is illustrated in C of FIG. 8. As illustrated in FIG. 8, the set B is moved to a position assumed by the user as a result of the drag operation described above, and has a circular shape. The set C is also moved to a position assumed by the user as a result of the drag operation described above, and has a circular shape.

As described above, with reference to FIG. 8, the shape and position of the set of events displayed on the screen are changed as a result of the drag operation.

When, in addition to the two-dimensional plot displayed as a result of the modification in step S205, the influence on a two-dimensional plot other than the two-dimensional plot can be grasped, it is considered to further contribute to the user's study as to whether the correction is appropriate. In particular, in a case where the number of fluorescent bodies labeling the particle population is large, it is considered to be useful to grasp the influence.

The two-dimensional plot generation unit included in the information processing apparatus according to the present technology is configured to be able to generate a two-dimensional plot group regarding any one fluorescent body of a plurality of fluorescent bodies labeling a particle population and each of all the other fluorescent bodies. Therefore, the influence can be grasped.

The two-dimensional plot generation unit 103 can execute two-dimensional plot group generation processing, for example, according to a predetermined user operation. The user operation may be, for example, clicking of a two-dimensional plot group generation button for causing the two-dimensional plot generation unit 103 to start the two-dimensional plot group generation processing. More specifically, for example, the two-dimensional plot group generation button may be provided in a window or worksheet that displays the two-dimensional plot modified in step S205 or another window or worksheet on the display. In step S206, the processing unit 101 advances the processing to step S207 in response to clicking of the two-dimensional plot group generation button by the user. In a case where the button is not clicked by the user, the processing unit 101 can advance the processing to, for example, step S211.

Figure 7A:
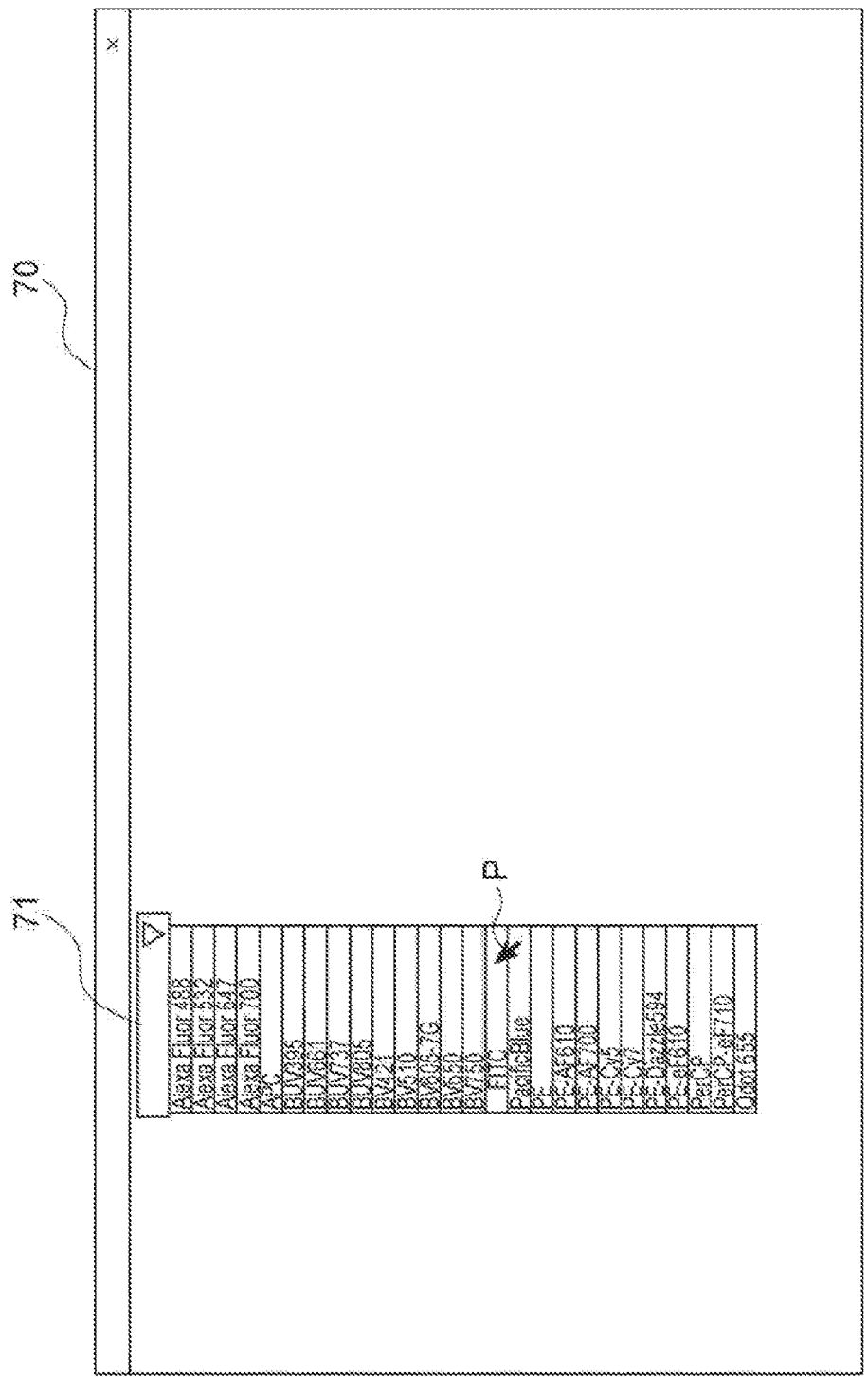
FIG. 7A is an example of a window in which a two-dimensional plot group generated according to the present technology is displayed.

In step S207, the two-dimensional plot generation unit 103 displays a window for displaying the two-dimensional plot group on the display. An example of the window is illustrated in FIG. 7A. A window 70 illustrated in FIG. 7A is provided with, for example, a list box 71 for selection of one fluorescent body of a plurality of fluorescent bodies (fluorescent dyes) labeling the particle population. As described above, the two-dimensional plot generation unit 103 can cause the display apparatus to display the list box for selection of any one fluorescent body of the plurality of fluorescent bodies.

In response to the user selecting one fluorescent body from the list box 71, the two-dimensional plot generation unit 103 generates a two-dimensional plot group regarding the one fluorescent body and each of all the other fluorescent bodies. Then, the two-dimensional plot generation unit 103 causes, for example, the display apparatus to display the generated two-dimensional plot group. The number of two-dimensional plots constituting the generated two-dimensional plot group may be smaller by one than the number of fluorescent bodies labeling the particle population, and may be, for example, 4 or more, particularly 7 or more, 9 or more, 14 or more, or 19 or more, and may further be 21 or more, 23 or more, or 25 or more. The number of two-dimensional plots constituting the generated two-dimensional plot group may be, for example, 49 or less, 44 or less, or 39 or less.

Figure 7B:
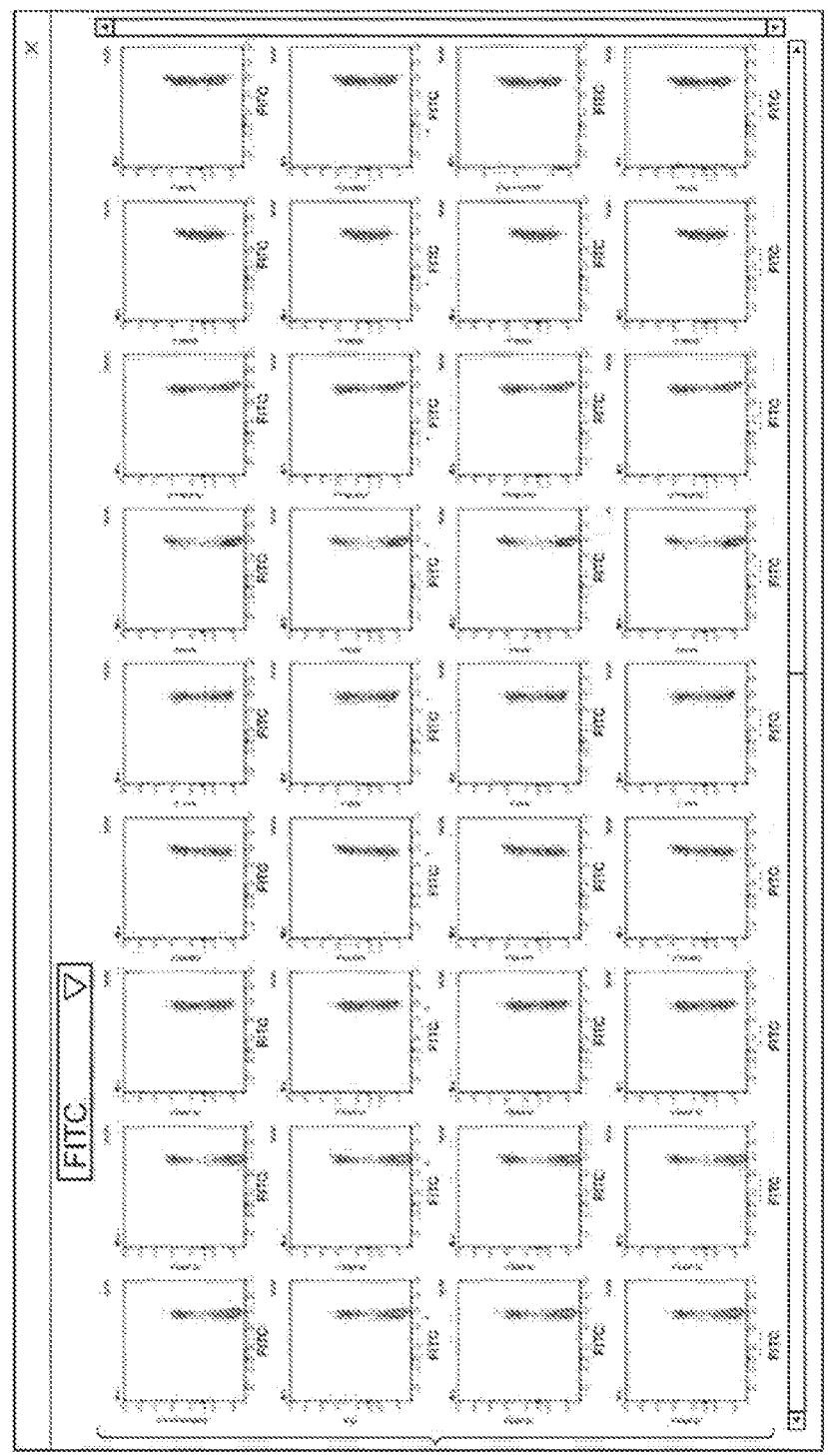
FIG. 7B is an example of a window in which a two-dimensional plot group generated according to the present technology is being displayed.

For example, it is assumed that the user selects FITC by clicking a mouse pointer P from the list box 71. The two-dimensional plot generation unit 103 generates a two-dimensional plot group 72 as illustrated in FIG. 7B in response to the selection of the FITC. In the two-dimensional plot group 72, as illustrated in FIG. 7B, the horizontal axis of all the two-dimensional plots is the fluorescence intensity of the FITC. Furthermore, the vertical axis of the two-dimensional plot group 72 is the fluorescence intensity of each fluorescent body other than the FITC.

As illustrated in FIG. 7B, in step S207, the two-dimensional plot generation unit 103 may generate a two-dimensional plot in which the fluorescence intensity of one fluorescent body selected by the user is the horizontal axis, or may generate a two-dimensional plot in which the fluorescence intensity is the vertical axis.

In one embodiment of the present technology, in step S207, the two-dimensional plot generation unit 103 can generate a two-dimensional plot group regarding any one of the fluorescent bodies the SR data of which has been modified in step S204 and each of all the other fluorescent bodies. In this embodiment, for example, the two-dimensional plot group may be automatically displayed in the window displayed in response to the user operation for starting the two-dimensional plot group generation processing. That is, the two-dimensional plot group may be displayed without the user selecting the fluorescent bodies from the list box described above.

For example, in a case where the two-dimensional plot 12 in FIG. 5 is subjected to the drag operation in step S203, the SR data of the fluorescent bodies of the two axes of the two-dimensional plot 12 can be modified in step S204. In this embodiment, in step S207, the two-dimensional plot generation unit 103 can generate a two-dimensional plot group regarding any one of the fluorescent bodies of the two axes of the two-dimensional plot 12 and each of all the other fluorescent bodies.

There is a case where the user is particularly interested in what kind of influence has occurred in the two-dimensional plot group by the modification of the SR data as a result of the correction processing of the two-dimensional plot, that is, there is a case where the user want to first grasp the influence of the modification of the SR data. According to the present embodiment, the influence can be grasped, and such need of the user can be satisfied.

When the two-dimensional plot group is generated, the two-dimensional plot generation unit 103 advances the processing to step S208.

In step S208, the two-dimensional plot generation unit 103 determines whether to end the display of the two-dimensional plot group.

In a case where the user performs an operation for ending the display of the two-dimensional plot group, the two-dimensional plot generation unit 103 determines to end the display of the two-dimensional plot group, and advances the processing to step S209. The operation may be, for example, clicking of a button for closing the window of the two-dimensional plot group by the user.

In a case where the operation is not performed, for example, the processing can proceed to step S207. Then, for example, the user can select one other fluorescent body from the list box 71. Then, according to the selection, the two-dimensional plot generation unit 103 can generate a two-dimensional plot group regarding the one other fluorescent body and each of all the other fluorescent bodies.

In step S209, the processing unit 101 determines whether to end the adjustment mode.

In a case where the operation for ending the adjustment mode is performed by the user, the processing unit 101 determines to end the adjustment mode and advances the processing to step S210. The operation may be, for example, clicking a button of the adjustment mode, clicking an adjustment mode end button, or the like.

In a case where it is not determined to end the adjustment mode, for example, the processing can return to step S203. Then, the correction processing for a specific two-dimensional plot may be performed again by the user.

In step S210, the processing unit 101 ends the adjustment mode. In response to the end of the adjustment mode, for example, in step S202, the processing unit 101 removes or cancels the predetermined decoration performed on the two-dimensional plot. For example, the processing unit 101 may erase the diagonal line added to the two-dimensional plot.

In step S107, the processing unit 101 can end, for example, the fluorescence data correction processing. Steps S209 and S210 described above may be performed in step S107.

Furthermore, prior to the end, the processing unit 101 can store the modified SR data, the fluorescence data after the unmixing processing, and the generated or corrected two-dimensional plot group in the storage unit 102.

As described above, the information processing apparatus 100 includes the two-dimensional plot generation unit 103 that generates a two-dimensional plot group regarding any one fluorescent body of a plurality of fluorescent bodies and each of all the other fluorescent bodies on the basis of the correction processing on one two-dimensional plot obtained from a result of the fluorescence detection for the particle population labeled with the plurality of fluorescent bodies. Therefore, it is possible to grasp how the correction of the two-dimensional plot influences not only the two-dimensional plot displayed on the display but also the two-dimensional plot of one fluorescent body and the other fluorescent bodies.

In one embodiment of the present technology, the two-dimensional plot generation unit 103 may generate an alert in a case where there is a plot that does not satisfy a predetermined criterion in the two-dimensional plot generated in the two-dimensional plot group generation processing in step S106. Details of steps S105 and S106 including an alert generation process will be described below with reference to FIG. 4B. Steps S301 to S305 in FIG. 4B correspond to the details of step S105. Steps S306 to 3010 in FIG. 4B correspond to the details of step S106.

Figure 4B:
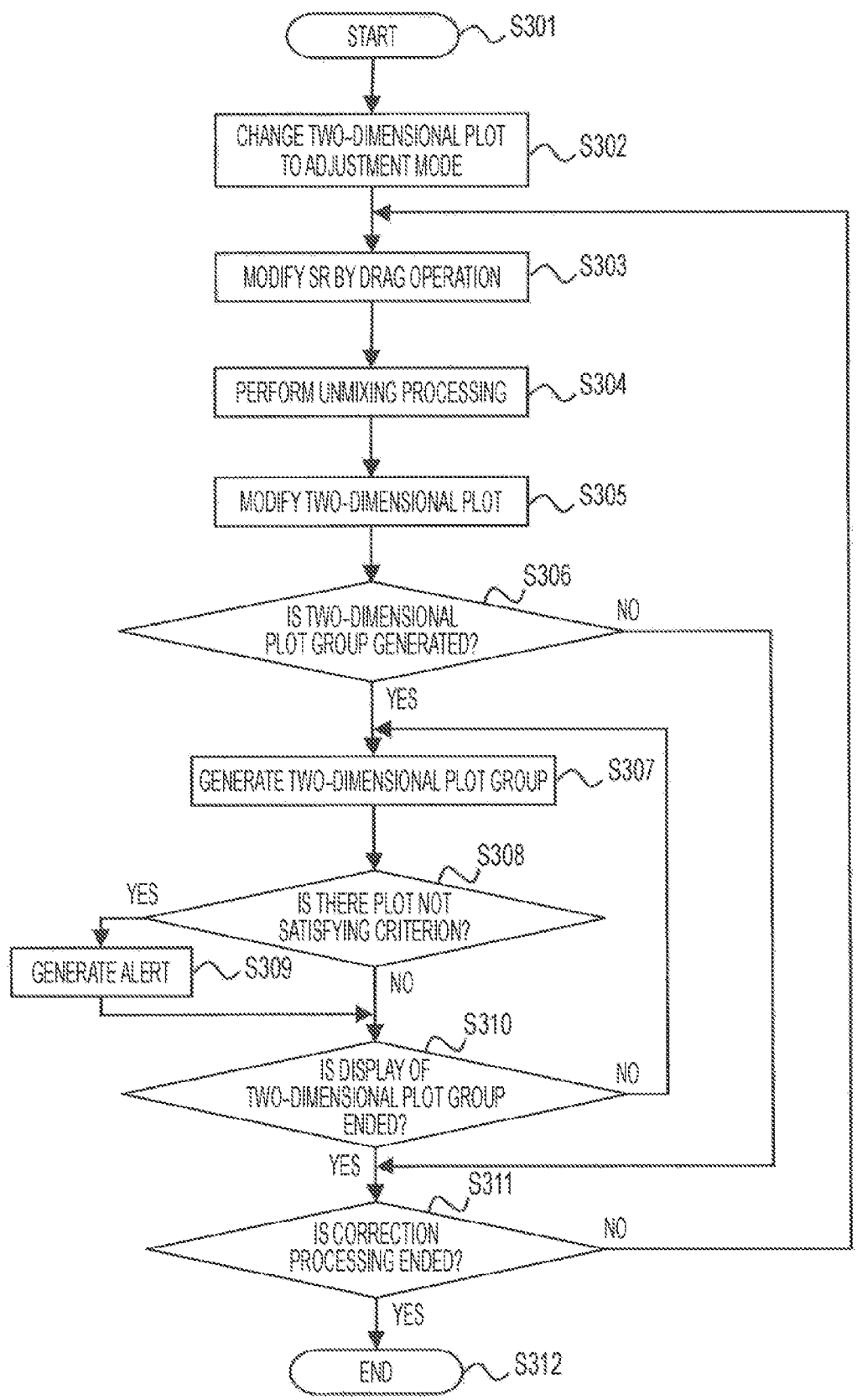
FIG. 4B is an example of a flowchart of processing by the information processing apparatus according to the present technology.

Steps S301 to S307 in FIG. 4B are the same as steps S201 to S207 in FIG. 4A. Therefore, description of steps S301 to S307 is omitted.

When the two-dimensional plot group is generated in step S307 in FIG. 4B, the two-dimensional plot generation unit 103 advances the processing to step S308.

In step S308, the two-dimensional plot generation unit 103 determines whether there is a two-dimensional plot not satisfying the criterion in the generated two-dimensional plot group. The criterion may be, for example, but is not limited to, that the number of events plotted within a predetermined range is a predetermined percentage or more. For example, it is possible to determine whether the criterion is not satisfied on the basis of the shape of an event population or the distance between event populations specified as a result of gating by the user on the two-dimensional plot or as a result of automatic gating processing by machine learning or the like. Specifically, the two-dimensional plot generation unit 103 determines that the criterion is satisfied when the shape of the event population is close to a perfect circle and the criterion is not satisfied in the case of the dispersed shape due to fluorescence leakage.

In a case where there is a two-dimensional plot not satisfying the criterion, the two-dimensional plot generation unit 103 advances the processing to step S309. In a case where there is no two-dimensional plot not satisfying the criterion, the two-dimensional plot generation unit 103 advances the processing to step S310.

In step S309, the two-dimensional plot generation unit 103 generates an alert indicating that the two-dimensional plot not satisfying the criterion is included in the two-dimensional plot group. Examples of the alert include, but are not limited to, displaying a two-dimensional plot not satisfying the criterion with a predetermined color, displaying a window describing that there is a two-dimensional plot not satisfying the criterion, or adding a predetermined mark to a two-dimensional plot not satisfying the criterion. After the generation of the alert, the two-dimensional plot generation unit 103 advances the processing to step S310.

As described above, the two-dimensional plot generation unit may display the alert on the display apparatus in a case where at least one two-dimensional plot of the two-dimensional plot group does not satisfy a predetermined condition. Therefore, the user can easily grasp the two-dimensional plot to be noted.

Steps S310 to S312 in FIG. 4B are the same as steps S208 to 210 in FIG. 4A. Therefore, description of steps S310 to S312 is omitted.

(2-7) Particle Population

The two-dimensional plot group generated in the present technology can be derived from a result of fluorescence detection for a particle population labeled with a plurality of fluorescent bodies. The particle population may be contained in the sample liquid at the time of the fluorescence detection. The type of the sample liquid may be appropriately selected by a person skilled in the art, and can be determined according to a consideration factor such as the type of particles (cells). I. Note that the type of the sheath liquid may be appropriately selected by a person skilled in the art.

The particle population can be labeled with a plurality of fluorescent bodies. The plurality of fluorescent bodies may be, for example, a plurality of dyes, particularly a plurality of fluorescent dyes. The fluorescent body may be, for example, a fluorescent body (dye) known in the technical field of flow cytometry. Examples of the fluorescent dye can include, but are not limited to, Cascade Blue, Pacific Blue, Fluorescein isothiocyanate (FITC), AlexaFluor488, Phycoerythrin (PE), Propidium iodide (PI), Texas Red (TR), PE-efluor 610, PE/Dazzle594, ECD (PE-TxRed), PE-CF594, PE-Vio 615, 7-AAD, PE/Cy5, Peridinin chlorophyll protein (PerCP), PerCP/Cy5.5, PerCP/eFluor710, PE/Cy7, Allophycocyanin (APC), AlexaFluor647, AlexaFluor700, APC-AlexaFluor700, APC/Fire750, APC/eFluor780, APC/H7, Brilliant Violet (BV421), BD Horizon V450, eFluor450, Pacific Blue, 4',6-Diamidino-2-phenylindole (DAPI), AmCyan, BD Horizon V500, Brilliant Violet 510, Pacific Orange, Brilliant Violet 570, Brilliant Violet 605, Brilliant Violet 650, eFluor 650NC, Brilliant Violet 711, Brilliant Violet 785, Cy3, Cy5, and Cy7.

The particle population may be, for example, a particle population labeled with 5 or more fluorescent bodies, and more preferably a particle population labeled with 8 types or more, 10 types or more, 15 types or more, or 20 types or more fluorescent bodies. The particle population may further be a particle population labeled with 22 types or more, 24 types or more, or 26 types or more fluorescent bodies. The particle population may be a particle population labeled with 50 types or less, 45 types or less, or 40 types or less fluorescent bodies. The information processing apparatus according to the present technology makes it possible to easily grasp the influence of the correction processing on the analysis result of the particle population labeled with such various types of fluorescent bodies (fluorescent dyes).

In the present technology, the particle may be, for example, a particle having a dimension capable of flowing in the flow path provided in the chip T. In the present technology, the particle may be appropriately selected by a person skilled in the art. In the present technology, the particles can include biological microparticles such as cells, cell masses, microorganisms, and liposomes, synthetic microparticles such as gel particles, beads, latex particles, polymer particles, and industrial particles, and the like.

The biological microparticles (also referred to as bioparticles) can include chromosomes, liposomes, mitochondria, organelles (cell organelles) and the like that constitute various cells. The cells can include animal cells (blood corpuscle cells or the like) and plant cells. The cells can in particular be blood cells or tissue cells. The blood cells may be suspension cells such as T cells and B cells. The tissue cells may be, for example, adherent cells separated from adherent cultured cells or tissues. The cell masses can include, for example, spheroids and organoids. The microorganisms can include bacteria such as *Escherichia coli*, viruses such as tobacco mosaic virus, fungi such as yeast, and the like. Moreover, the biological microparticles can also include biological macromolecules such as nucleic acids, proteins, and complexes thereof. These biological macromolecules may be, for example, those extracted from cells or those contained in blood samples or other liquid samples. In accordance with one embodiment of the present technology, the particle is a biological particle, particularly a cell.

The synthetic microparticles can be, for example, microparticles made of an organic or inorganic polymer material, metal, or the like. The organic polymer material can include polystyrene, styrene-divinylbenzene, polymethylmethacrylate, and the like. The inorganic polymer material can include glass, silica, magnetic materials, and the like. The metal can include colloidal gold, aluminium, and the like. The synthetic microparticles may be, for example, gel particles or beads, and more particularly, may be gel particles or beads to which one or a combination of two or more selected from an oligonucleotide, a peptide, a protein, and an enzyme is bound.

The shape of the particles may be spherical or substantially spherical, or may be non-spherical. The size and mass of the particles can be appropriately selected by a person skilled in the art depending on the size of the flow path of the chip. On the other hand, the size of the flow path of the chip can also be appropriately selected according to the size and mass of the particles.

In the present technology, the particle population may be a population including the particles described above, particularly may be a population of biological particles, and more particularly may be a population of cells. The particle population may be labeled with a plurality of fluorescent bodies. The fluorescent bodies may be the fluorescent dyes described above. Furthermore, the fluorescent dye may be bound to the particle (particularly, the cell) via a molecule (e.g., antibody, aptamer, DNA, RNA, or the like, in particular antibody) that specifically binds to the particle.

(2-8) Another Embodiment

The present technology also provides an information processing apparatus including: a spectral reference modification unit that modifies a spectral reference of each fluorescent body corresponding to fluorescence data of a two-dimensional plot according to a user operation on the two-dimensional plot obtained from a result of fluorescence detection for a particle population labeled with a plurality of fluorescent bodies; and a two-dimensional plot generation unit that generates a two-dimensional plot using fluorescence data obtained by unmixing processing using the modified spectral reference. The spectral reference modification unit and the two-dimensional plot generation unit can reflect the user operation on the two-dimensional plot to the two-dimensional plot correction processing, and the user can visually and intuitively grasp the influence of the correction processing.

The spectral reference modification unit and the two-dimensional plot generation unit are as described in (2-4) and (2-6) described above, and the description also applies to the present embodiment. Furthermore, the descriptions in (2-1) to (2-3) and (2-5) described above also apply to the present embodiment.

(2-9) Another Embodiment

The present technology also provides an information processing apparatus including a two-dimensional plot generation unit that generates a two-dimensional plot group regarding any one fluorescent body of ten or more fluorescent bodies and each of all the other fluorescent bodies from a result of fluorescence detection for a particle population labeled with the ten or more fluorescent bodies. The information processing apparatus may be configured as described, for example, in (2-1) to (2-5) above, and the description also applies to this embodiment.

The information processing apparatus according to this embodiment can execute, among the processing described in (2-6) described above, steps S101 to S104, and then perform the processing of steps S206 to S208 (two-dimensional plot group generation processing) or the processing of steps S306 to S310 (two-dimensional plot group generation processing) without performing the processing of steps S202 to S205 (two-dimensional plot correction processing). As described above, the information processing apparatus according to the present technology may perform the two-dimensional plot group generation processing described above without performing the two-dimensional plot correction processing. The information processing apparatus in this embodiment may be particularly directed to a fluorescence detection result for a particle population labeled with 15 or more fluorescent bodies, and may be for a particle population labeled with 20 or more, 22 or more, 24 or more, or 26 or more fluorescent bodies. The particle population may be a particle population labeled with 50 types or less, 45 types or less, or 40 types or less fluorescent bodies.

2. Second Embodiment (Particle Analysis Apparatus)

The present technology provides a particle analysis apparatus including a two-dimensional plot generation unit that generates a two-dimensional plot group regarding any one fluorescent body of a plurality of fluorescent bodies and each of all the other fluorescent bodies on the basis of correction processing on a two-dimensional plot obtained from a result of fluorescence detection for a particle population labeled with the plurality of fluorescent bodies. The two-dimensional plot generation unit is as described in 1. described above, and the description also applies to the present embodiment.

The particle analysis apparatus of the present technology may include, for example, the information processing apparatus, the light irradiation unit, and the detection unit described in top 1.

Since the particle analysis apparatus of the present technology includes the two-dimensional plot generation unit described above, it is easy to grasp the influence of the fluorescence leakage correction in multicolor analysis on the two-dimensional plot.

3. Third Embodiment (Information Processing Method)

The present technology also provide an information processing method including a two-dimensional plot group generation process of generating a two-dimensional plot group regarding any one fluorescent body of a plurality of fluorescent bodies and each of all the other fluorescent bodies on the basis of correction processing on a two-dimensional plot obtained from a result of fluorescence detection for a particle population labeled with the plurality of fluorescent bodies.

The information processing method according to the present technology can be performed, for example, for processing data obtained from a result of fluorescence detection for a particle population labeled with a plurality of fluorescent bodies. The information processing method according to the present technology can be executed by, for example, the information processing apparatus described in 1. described above (or the particle analysis system including the information processing apparatus) or the particle analysis apparatus described in 2. described above.

An example of a flowchart of the information processing method according to the present technology can be as illustrated in FIGS. 2 and 4 described in (2-6) of 1. described above.

The information processing method can include, for example, a fluorescence data acquisition process of acquiring fluorescence data obtained from a result of fluorescence detection for a particle population labeled with a plurality of fluorescent bodies, an unmixing processing process of performing unmixing processing on the fluorescence data, a two-dimensional plot generation process of generating a two-dimensional plot using the fluorescence data after the unmixing processing, and a two-dimensional plot correction process of performing correction processing on the generated two-dimensional plot and generating a two-dimensional plot group according to the correction processing.

The fluorescence data acquisition process corresponds to step S102 described in (2-6) of 1. described above. The unmixing processing process corresponds to step S103 described in (2-6) of 1. described above. The two-dimensional plot generation process corresponds to step S104 described in (2-6) of 1. described above. The two-dimensional plot correction process corresponds to steps S105 and S106 described in (2-6) of 1. described above. Therefore, the description of these steps in (2-6) of 1. described above also applies to each process in an information processing process of the present technology.

The two-dimensional plot correction process can include, for example, an SR modification process of modifying SR according to an operation on a two-dimensional plot, an additional unmixing processing process of performing unmixing processing using the SR modified in the SR modification process, a two-dimensional plot modification process of modifying the two-dimensional plot using fluorescence data after the additional unmixing processing process, and a two-dimensional plot group generation process of generating a two-dimensional plot group regarding any one fluorescent body of the plurality of fluorescent bodies and each of all the other fluorescent bodies.

The SR modification process corresponds to step S203 described in (2-6) of 1. described above. The additional unmixing processing process corresponds to step S204 described in (2-6) of 1. described above. The two-dimensional plot modification process corresponds to step S205 described in (2-6) of 1. described above. The two-dimensional plot group generation process corresponds to step S207 described in (2-6) of 1. described above. Therefore, the description of these steps in (2-6) of 1. described above also applies to these processes in the information processing process of the present technology.

4. Fourth Embodiment (Program)

The present technology also provide a program for causing an information processing apparatus (or a particle analysis apparatus or particle analysis system including the information processing apparatus) to execute a two-dimensional plot group generation process of generating a two-dimensional plot group regarding any one fluorescent body of a plurality of fluorescent bodies and each of all the other fluorescent bodies on the basis of correction processing on a two-dimensional plot obtained from a result of fluorescence detection for a particle population labeled with the plurality of fluorescent bodies. The process is as described in 1. and 3. described above, and the description also applies to the present embodiment.

The two-dimensional plot group generation process can be performed, for example, in a two-dimensional plot correction process of correcting a two-dimensional plot obtained from a result of fluorescence detection for a particle population labeled with a plurality of fluorescent bodies. That is, the program may be for causing an information processing apparatus (or a particle analysis apparatus or a particle analysis system including the information processing apparatus) to execute the two-dimensional plot correction process.

The two-dimensional plot correction process can further include, for example, the SR modification process, the additional unmixing processing process, and the two-dimensional plot modification process described in 3. described above.

Furthermore, the two-dimensional plot correction process may be executed as a process constituting a part of an information processing method for data obtained from a result of fluorescence detection for a particle population labeled with a plurality of fluorescent bodies. The information processing method can further include, for example, the fluorescence data acquisition process, the unmixing processing process, and the two-dimensional plot generation process described in 3. described above. The two-dimensional plot generated in the two-dimensional plot generation process can be corrected in the two-dimensional plot correction process.

Note that the present technology may adopt the configuration described below.

[1] An information processing apparatus including:
a two-dimensional plot generation unit that generates a two-dimensional plot on the basis of fluorescence data obtained from a particle population labeled with a plurality of fluorescent bodies, and generates a two-dimensional plot group regarding any one fluorescent body of the plurality of fluorescent bodies and each of all the other fluorescent bodies on the basis of correction processing on the two-dimensional plot.

[2] The information processing apparatus according to [1], in which the correction processing is correction processing based on a user operation on the two-dimensional plot displayed on a display apparatus.

[3] The information processing apparatus according to [1] or [2], further including: an output unit that outputs the generated two-dimensional plot group to a display apparatus.

[4] The information processing apparatus according to any one of [1] to [3], further including:
a spectral reference modification unit that modifies a spectral reference, in which
in the correction processing, the spectral reference modification unit modifies a spectral reference of each fluorescent body corresponding to fluorescence data of a two-dimensional plot subjected to the correction processing.

[5] The information processing apparatus according to [4], in which in the correction processing, the two-dimensional plot generation unit modifies the two-dimensional plot on the basis of fluorescence data subjected to unmixing processing using the modified spectral reference.

[6] The information processing apparatus according to any one of [1] to [5], in which the particle population is a particle population labeled with 10 types or more fluorescent bodies.

[7] The information processing apparatus according to any one of [1] to [6], in which the number of two-dimensional plots constituting the generated two-dimensional plot group is 9 or more.

[8] The information processing apparatus according to any one of [1] to [7], in which the fluorescence detection is fluorescence detection using a flow cytometer.

[9] The information processing apparatus according to any one of [1] to [8], in which the output unit outputs an alert to the display apparatus in a case where at least one two-dimensional plot of the two-dimensional plot group does not satisfy a predetermined condition.

[10] The information processing apparatus according to any one of [1] to [9], in which the output unit causes the display apparatus to display a list box for selection of any one fluorescent body of the plurality of fluorescent bodies.

[11] The information processing apparatus according to [10], in which the two-dimensional plot generation unit generates the two-dimensional plot group using a fluorescent body selected from the list box as any one fluorescent body.

[12] An information processing apparatus including:
a spectral reference modification unit that modifies a spectral reference of each fluorescent body corresponding to fluorescence data of a two-dimensional plot according to a user operation on the two-dimensional plot obtained from a result of fluorescence detection for a particle population labeled with a plurality of fluorescent bodies; and
a two-dimensional plot generation unit that generates a two-dimensional plot using fluorescence data obtained by unmixing processing using the modified spectral reference.

[13] The information processing apparatus according to [12], in which the user operation is a user operation on the two-dimensional plot displayed on a display apparatus.

[14] The information processing apparatus according to [12] or [13], in which the spectral reference modification unit modifies the spectral reference according to a drag operation in a direction of any one axis on the two-dimensional plot.

[15] The information processing apparatus according to [14], in which the spectral reference modification unit modifies a spectral reference of a fluorescent body corresponding to fluorescence data constituting the two-dimensional plot.

[16] The information processing apparatus according to any one of [12] to [15], in which the two-dimensional plot generation unit modifies a two-dimensional plot displayed on a worksheet in advance using the fluorescence data obtained by the unmixing processing.

[17] A particle analysis apparatus including:
a two-dimensional plot generation unit that generates a two-dimensional plot group regarding any one fluorescent body of a plurality of fluorescent bodies and each of all the other fluorescent bodies on the basis of correction processing on a two-dimensional plot obtained from a result of fluorescence detection for a particle population labeled with the plurality of fluorescent bodies.

[18] An information processing method including:
a two-dimensional plot group generation process of generating a two-dimensional plot on the basis of fluorescence data obtained from a particle population labeled with a plurality of fluorescent bodies, and generating a two-dimensional plot group regarding any one fluorescent body of the plurality of fluorescent bodies and each of all the other fluorescent bodies on the basis of correction processing on the two-dimensional plot.

[19] A program for causing an information processing apparatus to execute:
a two-dimensional plot group generation process of generating a two-dimensional plot on the basis of fluorescence data obtained from a particle population labeled with a plurality of fluorescent bodies, and generating a two-dimensional plot group regarding any one fluorescent body of the plurality of fluorescent bodies and each of all the other fluorescent bodies on the basis of correction processing on the two-dimensional plot.

[20] An information processing apparatus including: a two-dimensional plot generation unit that generates a two-dimensional plot group regarding any one fluorescent body of ten or more fluorescent bodies and each of all the other fluorescent bodies from a result of fluorescence detection for a particle population labeled with the ten or more fluorescent bodies.

REFERENCE SIGNS LIST

1 Particle analysis system
2 Light irradiation unit
T Chip
3 Detection unit
100 Information processing apparatus
101 Processing unit
102 Storage unit
103 Two-dimensional plot generation unit
104 Spectral reference modification unit
4 Output unit
5 Input unit

The invention claimed is:
1. An information processing apparatus comprising:
memory; and
a processor configured to:

generate a two-dimensional plot based on fluorescence data obtained from a particle population labeled with a plurality of fluorescent dyes, generate a two-dimensional plot group regarding any one fluorescent dye of the plurality of fluorescent dyes and each of all other of the plurality of fluorescent dyes based on correction processing on the two-dimensional plot; and modify at least one spectral reference of the plurality of fluorescent dyes corresponding to fluorescence data of the two-dimensional plot subjected to the correction processing to generate at least one modified spectral reference.

2. The information processing apparatus according to claim 1, wherein the correction processing is correction processing based on a user operation on the two-dimensional plot displayed on a display apparatus.

3. The information processing apparatus according to claim 1, wherein the processor is further configured to output the generated two-dimensional plot group to a display apparatus.

4. The information processing apparatus according to claim 3, wherein the processor outputs an alert to the display apparatus in a case where at least one two-dimensional plot of the two-dimensional plot group does not satisfy a predetermined condition.

5. The information processing apparatus according to claim 3, wherein the processor causes the display apparatus to display a list box for selection of any one fluorescent dye of the plurality of fluorescent dyes.

6. The information processing apparatus according to claim 5, wherein the processor generates the two-dimensional plot group using a fluorescent dye selected from the list box as the any one fluorescent dye.

7. The information processing apparatus according to claim 1, wherein in the correction processing, the processor modifies the two-dimensional plot on a basis of the fluorescence data subjected to unmixing processing using the at least one modified spectral reference.

8. The information processing apparatus according to claim 1, wherein the particle population is a particle population labeled with 10 types or more fluorescent dyes.

9. The information processing apparatus according to claim 1, wherein a number of two-dimensional plots constituting the generated two-dimensional plot group is 9 or more.

10. The information processing apparatus according to claim 1, wherein the fluorescence detection is fluorescence detection using a flow cytometer.

11. An information processing apparatus comprising:
a non-transitory computer readable medium storing instruction that, when processed by a processor, cause the processor to:
modify a spectral reference of each fluorescent body corresponding to fluorescence data of a two-dimensional plot according to a user operation on the two-dimensional plot obtained from a result of fluorescence detection for a particle population labeled with a plurality of fluorescent bodies; and generate the two-dimensional plot using fluorescence data obtained by unmixing processing using the spectral reference modified by the spectral reference modification unit.

12. The information processing apparatus according to claim 11, wherein the user operation is a user operation on the two-dimensional plot displayed on a display apparatus.

13. The information processing apparatus according to claim 11, wherein the spectral reference modification unit modifies the spectral reference according to a drag operation in a direction of any one axis on the two-dimensional plot.

14. The information processing apparatus according to claim 13, wherein the spectral reference modification unit modifies a spectral reference of a fluorescent body corresponding to fluorescence data constituting the two-dimensional plot.

15. The information processing apparatus according to claim 11, wherein the two-dimensional plot generation unit modifies a two-dimensional plot displayed on a worksheet in advance using the fluorescence data obtained by the unmixing processing.

16. A flow cytometry apparatus comprising:
a light source configured to irradiate light to each particle of a particle population labeled with a plurality of fluorescent dyes;
a plurality of detectors configured to detect a fluorescence generated by irradiating the particle population labeled with the plurality of fluorescent dyes; and
a processor configured to:
generate a two-dimensional plot based on fluorescence data obtained from the fluorescence detected by the plurality of detectors;
generate a two-dimensional plot group regarding any one fluorescent dye of the plurality of fluorescent dyes and each of all other fluorescent dyes of the plurality of fluorescent dyes based on correction processing on a two-dimensional plot; and
modify one or more spectral references of the plurality of fluorescent dyes corresponding to fluorescence data of the two-dimensional plot subjected to the correction processing.

17. An information processing method comprising:
a two-dimensional plot group generation process of generating a two-dimensional plot on a basis of fluorescence data obtained from a particle population labeled with a plurality of fluorescent bodies, and generating a two-dimensional plot group regarding any one fluorescent body of the plurality of fluorescent bodies and each of all the other fluorescent bodies on a basis of correction processing on the two-dimensional plot; and
a spectral reference modification process of performing the correction processing by modifying a spectral reference of each fluorescent body corresponding to fluorescence data of the two-dimensional plot subjected to the correction processing.

* * * * *